12) United States Patent
Saltzman et al.

(10) Patent No.: US 7,895,081 B1
(45) Date of Patent: Feb. 22, 2011

(54) FACILITATING TRANSACTIONS INVOLVING BUYING ITEMS FROM AND SELLING ITEMS TO USERS

(75) Inventors: Brian J. Saltzman, Seattle, WA (US); Neil C. Roseman, Seattle, WA (US); Mehmet A. Elicin, Seattle, WA (US); Robert Frederick, Seattle, WA (US); Pierre Galin, Seattle, WA (US); Stefan Pepe, Seattle, WA (US); Jonathan D. Phillips, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1087 days.

(21) Appl. No.: 11/618,375

(22) Filed: Dec. 29, 2006

(51) Int. Cl.
*G06Q 30/00* (2006.01)

(52) U.S. Cl. ...................................................... 705/26

(58) Field of Classification Search ............... 705/26, 705/27
See application file for complete search history.

(56) References Cited

U.S. PATENT DOCUMENTS

| | | | | |
|---|---|---|---|---|
| 5,960,407 | A | 9/1999 | Vivona | 705/10 |
| 6,101,484 | A | 8/2000 | Halbert et al. | 705/26 |
| 6,604,089 | B1 | 8/2003 | Van Horn et al. | 705/26 |
| 6,631,356 | B1 | 10/2003 | Van Horn et al. | 705/26 |
| 6,847,938 | B1 * | 1/2005 | Moore | 705/26 |
| 6,915,274 | B2 | 7/2005 | Abhyanker | 70/26 |
| 6,934,690 | B1 | 8/2005 | Van Horn et al. | 705/26 |
| 2002/0032668 | A1 | 3/2002 | Kohler et al. | 705/401 |
| 2002/0046128 | A1 | 4/2002 | Abe et al. | 705/26 |
| 2002/0069117 | A1 | 6/2002 | Carothers et al. | 70/26 |
| 2002/0123937 | A1 | 9/2002 | Pickover et al. | 705/26 |
| 2003/0023505 | A1 | 1/2003 | Eglen et al. | 705/26 |
| 2003/0028394 | A1 | 2/2003 | Alzer et al. | 705/1 |
| 2003/0061119 | A1 | 3/2003 | Kocher | 705/26 |
| 2003/0061150 | A1 | 3/2003 | Kocher | 705/37 |
| 2003/0069740 | A1 * | 4/2003 | Zeidman | 705/1 |
| 2003/0078858 | A1 | 4/2003 | Angelopoulos et al. | 705/26 |
| 2003/0110054 | A1 | 6/2003 | Lindquist | |
| 2003/0200151 | A1 | 10/2003 | Ellenson et al. | 705/26 |
| 2003/0204449 | A1 | 10/2003 | Kotas et al. | |

(Continued)

OTHER PUBLICATIONS

"About Peerflix," Peerflix, accessed Feb. 14, 2006, from http://www.peerflix.com/Default.aspx?tabid=69, 2 pages.

(Continued)

*Primary Examiner*—Naeem Haq
(74) *Attorney, Agent, or Firm*—Seed IP Law Group PLLC

(57) ABSTRACT

Techniques are described for facilitating transactions involving items and users in various ways. In some situations, item transactions are coordinated by an automated Item Transaction (or "IT") system provided via one or more computing systems, such that users of the IT system who have available items are matched with other users of the IT system who desire those items. The types of items being involved in transactions via the IT system may vary, and in some situations may include items such as music CDs, video DVDs, computer games, computer software, etc. The operation of the IT system may be enhanced in various ways via interactions with one or more external item marketplaces, such as by automatically obtaining and using information related to users of the IT system from those marketplaces, and/or by acquiring additional items from those marketplaces for use by the IT system.

59 Claims, 11 Drawing Sheets

U.S. PATENT DOCUMENTS

| | | | |
|---|---|---|---|
| 2004/0049444 A1 | 3/2004 | Sato | 705/37 |
| 2004/0138962 A1 | 7/2004 | Kopelman et al. | 705/26 |
| 2004/0172335 A1 | 9/2004 | Batoff | 705/22 |
| 2005/0071249 A1 | 3/2005 | Nix et al. | 705/26 |
| 2005/0102189 A1 | 5/2005 | Lopez et al. | 705/26 |
| 2005/0197907 A1 | 9/2005 | Weiss | |
| 2005/0289017 A1 | 12/2005 | Gershom | 705/26 |
| 2005/0289039 A1 | 12/2005 | Greak | 705/37 |
| 2006/0026077 A1 | 2/2006 | Silverman et al. | 705/26 |
| 2007/0124216 A1* | 5/2007 | Lucas | 705/27 |
| 2008/0077477 A1 | 3/2008 | McElhiney et al. | |

OTHER PUBLICATIONS

"DVDs: Buy Trade Used DVD Movies Online," Peerflix.com homepage, accessed Aug. 15, 2006, from http://www.peerflix.com, 1 page.

"DVDs: Trade Used DVD Movies Online," Peerflix, accessed Aug. 15, 2006, from http://www.peerflix.com/Default.aspx?tabid=64, 2 pages.

"How It Works," Netflix, accessed Aug. 15, 2006, from http://www.netflix.com/HowItWorks?1nkctr=nmhhiw, 2 pages.

"Peerflix: No DVD Rentals! Trade Your DVDs-> Details: How Does It Work," Peerflix, accessed Feb. 14, 2006, from http://www.peerflix.com/Default.aspx?tabid=64, 2 pages.

"Tired of your DVDs? Swap 'em online: Peerflix matches buyers and sellers for 99 cents a trade," Reuters, MSNBC.com, Sep. 19, 2005, accessed Nov. 8, 2005, from http://www.msnbc.msn.com/id/9400475/print/1/displaymode/1098/, 2 pages.

Kanellos, Michael, "DVD swap site switches from credits to cash," CNET News.com, Dec. 17, 2006, accessed Dec. 18, 2006, from http://msn-cnet.com.com/2102-1038_3-6144169/html?tag=st.util.print, 2 pages.

"Billy McNair, CEO of PeerFlix," BestOfBusinessInterviews.com, accessed Apr. 17, 2006, from http://www.bestofbusinessinterviews.com/billy_mcnair.htm, 5 pages.

"Hitflip: Swap DVDs and audiobooks Instead of Renting Them! The Large Swapping platform," Hitflip (formerly Swopex), accessed May 16, 2007, from http://www.hitflip.co.uk/about-us.html, 2 pages.

"Swopex Launches Online DVD Swapping Site for the UK," Sep. 27, 2005, PRNewswire, accessed Apr. 17, 2006, from http://www/prnewswire.co.uk/cgi/news/release?id+154635, 1 page.

"Traders Trade 2001 Archives," accessed Apr. 24, 2006, from http://www.traderstrade.com/2001/, 11 pages.

Barterbee.com, Catch the Buzz and Pass it On!, accessed Apr. 17, 2006, from http://www.barterbee.com/, 1 page.

Barterbee.com, Getting Points, accessed Apr. 17, 2006, from http://www.barterbee.com/xmain0003/?_hp=point, 1 page.

Barterbee.com, How to Buy, accessed Apr. 17, 2006, from http://www.barterbee.com/xmain0003/?_hp=buy, 1 page.

Barterbee.com, How to Sell, accessed Apr. 17, 2006, from http://www.barterbee.com/xmain0003/?_hp=sell, 1 page.

Borland, J., "Moogul Wants You to Share Your Shovel," Jul. 9, 2004, accessed Apr. 17, 2006, from http://news.com/2102-1032_3-5262592.html?tag=st.util.print, 2 pages.

Boudreau, J., "Start-up to Offer CD-Swap Network," Mar. 7, 2006, Mercury News, accessed Apr. 17, 2006, from http://www.mercurynews.com/mld/mercurynews/business/14037158.htm, 2 pages.

Claburn, T., "Peerflix Launches Peer-To-Peer DVD Service," Sep. 20, 2005, InformationWeek, accessed Apr. 2, 2007, from http://www.informationweek.com/showArticle.jhtml?articleID=170704717, 5 pages.

Cook, J., "Venture Capital: Where Mercata Led, Consumers Were Unwilling to Follow," Jan. 12, 2001, Seattle Post-Intelligencer, accessed Apr. 5, 2006, from http://seattlepi.nwsource.com/printer/index.asp?ploc=b, 4 pages.

Dean, K., "Swap DVDs Online For A Buck," Jun. 1, 2005, Wired News, accessed Apr. 17, 2006, from http://www.wired.com/news/digiwood/1,67656-1.html, 5 pages.

Erento.com, "Rent, Hire, Rental, Borrow, Share—Erento," accessed Apr. 17, 2006, from http://www.erento.com/rent/, 2 pages.

Erento.com, "Erento—Mieten Und Vermieten—Neu Bei Erento?," accessed Jun. 7, 2007, from http://www.erento.com/mieten/index.php?action=hilfe_01 and translated by http://babelfish.altavista.com/babelfish/tr, 1 page.

Festa, P., "Consumer Sites Adopt Barter Model," c/net News.com, accessed Apr. 24, 2006, from http://news.com.com/2102-1017_3-235886.html?tag=st.util.print, 3 pages.

Lala.com, "How it Works," accessed May 16, 2007, from http://www.lala.com/frontend/action/howitworks, 2 pages.

Mediachest.com, "Mediachest FAQ", accessed Apr. 17, 2006, from http://www.mediachest.com/help/faq.html, 2 pages.

Mediachest.com, homepage, accessed Apr. 17, 2006, from http://www.mediachest.com/, 1 page.

MYDREW.com, "How It Works . . . ", accessed May 16, 2007, from http://www.mydrew.com/help/how_it_works.htm, 3 pages.

MYDREW.com, homepage, accessed May 16, 2007, from http://www.mydrew.com, 5 pages.

Shepard, G., "Peer-To-Peer Movies With Peerflix," Mar. 11, 2005, SiliconBeat, accessed Apr. 2, 2007, from http://www.siliconbeat.com/entries/2005/03/10/peertopeer_movies_with_peerflix.html, 4 pages.

SonicSwap.com, "Frequently Asked Questions,", accessed Apr. 17, 2006, from http://www.sonicswap.com/SiteInformation/faqs.jsp?MemberID=, 3 pages.

SwapSimple.com, Browse Items Available for Trade on SwapSimple.com (by $1^{st}$ letter of title) [?], accessed Apr. 14, 2006, from http://swapsimple.com/browse/dvd/F_/list.do, 2 pages.

SwapSimple.com, homepage, accessed Apr. 14, 2006, from http://swapsimple.com/, 2 pages.

SwapSimple.com, Welcome to the SwapSimple Trading Community, accessed Apr. 14, 2006, from http://swapsimple.com/how_swapsimple_works.jsp, 2 pages.

SwitchDiscs.com, "About SwitchDiscs.com", accessed Apr. 14, 2006, from http://www.switchdiscs.com/about.php, 2 pages.

Swopex.com, "Frequently Asked Questions," accessed May 16, 2007, from http://web.archive.org/web/20051013084607/http://www.swopex.com/pages/faq/, 13 pages.

TitleTrader.com, FAQs, accessed Apr. 5, 2006, from http://titletrader.com/faqs.php, 2 pages.

TitleTrader.com, homepage, accessed Apr. 5, 2006, from http://titletrader.com/, 2 pages.

TitleTrader.com, Premium Features, accessed Apr. 5, 2006, from http://titletrader.com/premium.php, 2 pages.

TradeAway.com, "Why Trade?," accessed Apr. 5, 2006, from http://www.tradeaway.com/abouttrade.phtml, 4 pages.

TradeAway.com, homepage, accessed Apr. 5, 2006, from http://www.tradeaway.com, 2 pages.

U-Exchange.com, Business Barter for Goods and Services, accessed Apr. 5, 2006, from http://www.u-exchange.com/businessbarter.asp, 2 pages.

* cited by examiner

IT System Customer Database 210

| | Customer ID | Name | Address | Date Joined | Items Received | Items Provided | ... |
|---|---|---|---|---|---|---|---|
| 211 | 0001 | Customer AAA | Address AAA | 1/12/XX | 17 | 23 | |
| 212 | 0002 | Customer BBB | Address BBB | 10/1/XX | 12 | 5 | |
| 213 | 0003 | Customer CCC | Address CCC | 2/3/XX | 0 | 1 | |
| 214 | 0004 | Customer DDD | Address DDD | 4/7/XX | 19 | 35 | |
| 215 | 0005 | Customer EEE | Address EEE | 12/15/XX | 0 | 13 | |
| ... | | | | | | | |

IT System Item Database 220

| | Item Name | Item ID | Item Type | Date Released | Total Desired Listings | Total Availability Listings | ... |
|---|---|---|---|---|---|---|---|
| 221 | Item WWW | 10001 | DVD | 3/1/XX | 103 | 20 | |
| 222 | Item XXX | 10002 | DVD | 12/17/XX | 233 | 87 | |
| 223 | Item YYY | 10003 | CD | 5/22/XX | 28 | 27 | |
| 224 | Item ZZZ | 10004 | DVD | 6/12/XX | 12 | 211 | |
| ... | | | | | | | |

Figure 2A

IT System Item Injection Decision Information 230

| Item Name | Number of Projected Future Desired Listings | Number of Projected Future Availability Listings | Estimated Total Revenue Per Injected Copy | Estimated Other Monetary Benefit Per Injected Copy | ... |
|---|---|---|---|---|---|
| Item WWW | 312 | 214 | $2.05 | $0.00 | |
| Item XXX | 371 | 160 | $1.91 | $0.77 | |
| Item YYY | 412 | 414 | $0.61 | $0.00 | |
| Item ZZZ | 81 | 597 | $0.30 | $0.04 | |
| ... | | | | | |

Item Acquisition Cost Database 240

| Item Name | Price At Used Item Marketplace A (Affiliated) | Price At Used Item Marketplace B (Unaffiliated) | Price At New Item Marketplace C (Affiliated, With Same Operator as ITS) | Price At Auction Site D (Unaffiliated) | ... |
|---|---|---|---|---|---|
| Item WWW | $1.50 | $1.75 | $10.20 | $3.02 | |
| Item XXX | $2.23 | $2.00 | - | $3.57 | |
| Item YYY | - | $4.23 | $11.17 | $5.39 | |
| ... | | | | | |

Figure 2B

Affiliated New Item Marketplace C Purchase Database 250

|   | Item Name | Date of Purchase | Customer Name | Item Type | Recipient Name | ... |
|---|---|---|---|---|---|---|
| 251 | Item YYY | 6/1/XX | Customer CCC | CD | Customer CCC | |
| 252 | Item NNN | 11/15/XX | Customer AAA | DVD | Customer CCC | |
| 253 | Item QQQ | 3/27/XX | Customer PPP | DVD | Customer PPP | |
| ... | | | | | | |

Affiliated Used Item Marketplace A Purchase Database 260

|   | Item Name | Date of Purchase | Customer Name | Item Type | Recipient Name | ... |
|---|---|---|---|---|---|---|
| 261 | Item FFF | 2/11/XX | Customer CCC | DVD | Customer CCC | |
| 262 | Item RRR | 10/19/XX | Customer CCC | CD | Customer CCC | |
| 263 | Item SSS | 4/1/XX | Customer BBB | DVD | Customer DDD | |
| ... | | | | | | |

Affiliated Used Item Marketplace A Customer Possible Acquisition Database 270

|   | Customer Name | Item Name(s) | ... |
|---|---|---|---|
| 271 | Customer CCC | Item DEF, Item RST, Item XYZ ... | |
| 272 | Customer BBB | Item CDE, Item LMN ... | |
| 273 | Customer EEE | Item KLM, Item QRS, Item WXY ... | |
| 274 | Customer AAA | Item BCD ... | |
| ... | | | |

Figure 2C

FACILITATING TRANSACTIONS INVOLVING BUYING ITEMS FROM AND SELLING ITEMS TO USERS

CROSS REFERENCE TO RELATED APPLICATIONS

This application is related to U.S. patent application Ser. No. 11/618,434, filed concurrently and entitled "Facilitating Identification Of Items To Make Available For Sale To Users," which is hereby incorporated by reference in its entirety.

TECHNICAL FIELD

The following disclosure relates generally to facilitating transactions involving buying items from users and selling items to users, such as to assist users participating in an item transaction system.

BACKGROUND

The Internet comprises a vast number of computers and computer networks that are interconnected through communication links, with access to information being provided using various services such as electronic mail ("email") and the World Wide Web (also referred to as the "Web"). In addition to providing access to information, the Web has increasingly become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online retailer or electronic marketplace that provides one or more items, such as to view information about the items, give an instruction to place an order for one or more items, and provide information needed to complete the purchase (e.g., payment and shipping information). The Web merchant then fulfills the order by providing the ordered items to the indicated recipient, such as by providing product items that have been ordered through physical distribution channels (e.g., shipment via a governmental postal service or private common carrier) or electronically (e.g., via download over the Internet, such as for digital music or videos) as appropriate. Ordered service items may similarly be provided electronically (e.g., providing email service) or physically (e.g., performing cleaning services at the purchaser's house).

Some Web sites have arisen that allow users to sell and purchase items to and from each other, such as DVD movies, audio CDs, or video games. A user will typically register to become a customer by entering personal information, such as the user's name, mailing address and payment information. Once registered, the customer can interact with other customers to provide or receive items. For example, a customer may be able to specify items that (s)he would like to receive from others and/or items that (s)he is willing to provide to others. When a match between two customers is made for a particular item, the customer who has the item provides it to the other customer who would like to receive it, typically based on some form of compensation given to the customer providing the item (e.g., monetary payment, "points" or other form of credit tracked by the Web site, etc.). Similarly, the customer who receives an item typically provides some form of compensation for receiving the item. Matches may be made automatically (e.g., by matching customers who would like to provide and receive the same item) or directly by the customers (e.g., by one of the customers searching for and identifying another customer with whom to participate in an item transaction). The operator of such a Web site may in some cases obtain revenue in various ways, such as by charging a fee for each item transaction, by charging a fee for membership, etc.

However, various problems exist with such Web sites for facilitating transactions involving items and users. One such problem results from frequent imbalances between demand and supply for at least certain types of items, resulting in significant customer dissatisfaction and loss of customer goodwill. For example, items that are new or otherwise highly popular will typically have demand that greatly exceeds supply, since few if any customers will have item copies that they are willing to provide to others. Such supply imbalances will typically prevent most customers who desire such an item from obtaining a copy in a timely manner (or at all). Another problem relates to attracting and retaining customers, such as due to difficulties in interacting with the Web site. For example, a new customer may need to enter large amounts of information in order to register for or effectively use such capabilities of such a Web site (e.g., to specify items that the customer is willing to provide and that the customer desires to obtain), but such information specification is typically burdensome. To specify items to be made available to others, for example, a customer may need to inventory his/her collection of items to identify appropriate items, and then manually enter a large amount of information for each item (e.g., an item name or title, data format, storage medium, condition, the number of copies of the item owned by the user, a photo, etc.). Faced with these problems, many potential customers may choose not to participate, thus potentially exacerbating the supply shortage problem described above, as those potential customers who have the most items to make available may be the least willing to participate in the burdensome item specification process.

Thus, it would be beneficial to provide techniques to facilitate transactions involving items and users, as well as to provide other benefits.

BRIEF DESCRIPTION OF THE DRAWINGS

FIGS. 2A-2E illustrate examples of facilitating transactions involving items and users of an item transaction system by determining when to make additional items available to users.

DETAILED DESCRIPTION

Techniques are described for facilitating transactions involving items and users in various ways. In some embodiments, the item transactions are coordinated by an automated Item Transaction (or "IT") system provided via one or more computing systems, such that users of the IT system who have available items are matched with other users of the IT system who desire those items. Item transactions involving the items may then occur via the IT system, such as for the IT system to engage in a purchase transaction to purchase an item from a user who has the item available and to engage in a sales transaction to sell the purchased item to the matched user who desires the item. When referring herein to a transaction via the IT system involving an item and one or more users, the transaction is defined as including one or both of the following: (1) the IT system purchases or buys the item from a first user; and (2) the IT system sells the item to a second user. The types of items involved in transactions via the IT system may vary, and in some embodiments may include items such as music CDs, video DVDs, computer games, computer software, etc. In at least some embodiments, the operation of the IT system is enhanced in various ways via interactions with one or more external item marketplaces, such as by automatically obtaining and using information related to users of the IT system from those marketplaces, and/or by acquiring additional items from those marketplaces for use by the IT system. Additional details related to interactions with external item marketplaces are described below.

Figure 1:
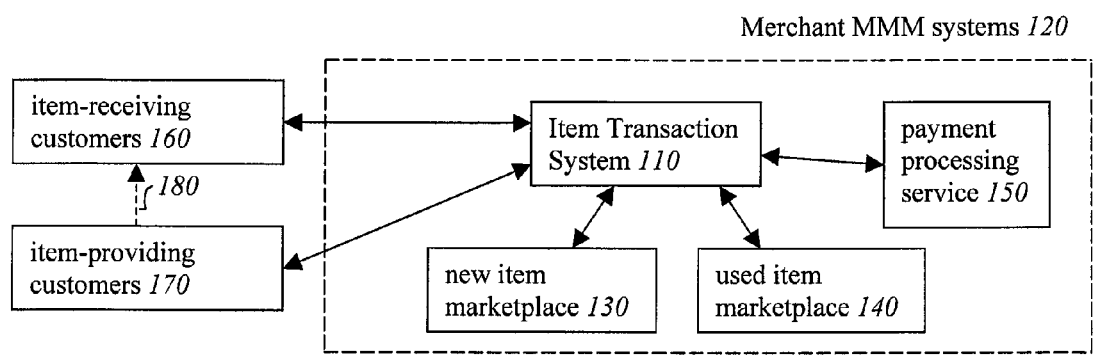
FIG. 1 illustrates an example embodiment of an item transaction system capable of interacting with customers to provide the described techniques.

FIG. 1 illustrates an example of an environment in which an embodiment of the IT system may operate, which in this example is illustrated as an Item Transaction System 110 executing on one or more computing systems (not shown). The Item Transaction System 110 facilitates transactions involving items and users who are customers of the Item Transaction System, and in particular facilitates transactions in which items are sent from various item-providing customers 170 to various item-receiving customers 160. For example, after an item-receiving customer makes a request to the Item Transaction System for a copy of an indicated item, the Item Transaction System determines whether one or more item-providing customers have indicated that they have a copy of the requested item available. If so, the Item Transaction System in this example purchases a copy of the item from one of those item-providing customers, sells a copy of the item to the item-receiving customer, and sends directions to that item-providing customer to send the item copy to the requesting item-receiving customer. In some embodiments, the Item Transaction System may first verify that the item-providing customer is willing to sell the copy of the item. For example, if multiple customers are able to sell a copy of the item, the Item Transaction System may indicate the opportunity to sell the item to some or all of the item-providing customers who are able to sell a copy of the item (e.g., along with timing-related or other constraints regarding how and/or when the item is to be sent to the requesting customer). After one of the item-providing customers agrees to sell a copy of the item to the requesting customer (e.g., the first one that agrees), the Item Transaction System would then send directions to that item-providing customer to send a copy of the item to the requesting item-receiving customer. The sending of the items between customers may occur in various ways, such as via a direct transport 180 between the customers (e.g., via the postal service, a private delivery company, physical meeting of the customers, etc.), or instead with the Item Transaction System or another entity acting as an intermediary (not shown).

The Item Transaction System may also perform various other actions, such as tracking and using various information about the customers and their activities. For example, the Item Transaction System may track current "points" or other credits provided by the Item Transaction System, such as points that are credited by the Item Transaction System to customers who sell items and that are debited by the Item Transaction System from customers who buy items. In addition, while illustrated here as separate groups for the sake of clarity, it will be appreciated that at least some of the customers of the Item Transaction System may be both item-providing customers and item-receiving customers, such as for different items and by interacting with different other customers. Furthermore, the customers 160 and 170 may interact with the Item Transaction System and optionally each other in various ways (not shown), such as via a Web site provided by the Item Transaction System and/or by using other electronic communications methods (e.g., email, telephone, text messaging, instant messaging, SMS, MMS, etc.).

In this example, the Item Transaction System 110 is operated by an example Merchant MMM as one of the merchant's systems 120, and is electronically interacting with other affiliated systems that may also optionally be operated by Merchant MMM. In particular, the other systems in this example include a new item marketplace 130 that sells new items of one or more types to customers (e.g., via a Web store or other electronic marketplace), a used item marketplace 140 that sells used items of one or more types to customers (e.g., via a Web store or other electronic marketplace), and a payment processing service 150 that processes indicated payments on request. While not illustrated here, at least some of the customers of the new and used item marketplaces may include at least some of the customers 160 and 170 of the Item Transaction System, and thus those marketplaces may have various information about prior interactions of those customers with the marketplaces. In addition, at least some of the items involved in transactions via the Item Transaction System may also be sold or otherwise provided via one or more of the marketplaces, and thus the marketplaces may have a variety of information about such items (including a current price for a new copy and/or a used copy of a particular item).

In some embodiments, the Item Transaction System may charge a transaction fee to customers under certain circumstances, such as to each customer who receives an item through the Item Transaction System (e.g., in addition to points or other credits that are debited from the customer receiving the item). If so, the Item Transaction System interacts with the payment processing service 150 in this example to obtain the appropriate transaction fees from the customers, including to obtain pre-paid transactions fees in certain circumstances as discussed in greater detail below. In some embodiments, the customers may have previously interacted with the Item Transaction System (e.g., during a customer registration process) to specify one or more fee payment mechanisms that the payment processing service is directed to use, such as a credit card, bank account, or other source of funds. In addition, systems such as the new item marketplace 130 and the used item marketplace 140 may each take various forms in various embodiments, such as physical brick-and-mortar stores operated by retailers, physical or electronic auction sites, etc. In other embodiments, various of the systems may operate in other manners, such as if the new item marketplace 130 and the used item marketplace 140 are part of a single marketplace that sells both new and used items, if one or more of the new item marketplace 130, used item marketplace 140 and payment processing service 150 are third-party systems operated by other entities unrelated to Merchant MMM, and/or if other additional item-providing systems are present.

As previously noted, information obtained from one or more systems external to the Item Transaction System may be used to facilitate item transactions between customers of the Item Transaction System in various ways. In particular, in this example, information may be obtained from the new item marketplace 130 and/or the used item marketplace 140 about prior interactions of the Item Transaction System customers with those marketplaces and/or about current information about items of interest. For example, information about prior interactions of customers involving purchasing, receiving and/or otherwise interacting with items via the marketplaces may be used to assist the customers in identifying items to potentially make available for transactions via the Item Transaction System, such as to track items that a customer has received from the item marketplaces for use as possible items that the customer may make available to provide via the Item Transaction System, and/or to recommend items that a customer may desire to receive via the Item Transaction System based on other prior item interactions. Information about current new and/or used prices for items may also be used in various ways, including to assist in valuing items involved in transactions via the Item Transaction System (e.g., by tracking item values in monetary units and/or via "points" or other credits issued by the Item Transaction System). Furthermore, if demand exceeds supply for one or more items via the Item Transaction System, the Item Transaction System may in some circumstances automatically decide to acquire additional copies of those items for use in the Item Transaction System, such as by acquiring those additional item copies from the used item marketplace 140 and/or item marketplace 130. Additional details related to such interactions with external marketplaces are included below.

For illustrative purposes, some embodiments are described below in which specific types of items are involved in transactions between users in specific ways, and in which an item transaction system facilitates such item transactions in various ways. However, it will be appreciated that the described techniques may be used in a wide variety of other situations, including with other types of items, and that the invention is not limited to the exemplary details provided.

Figure 2D:
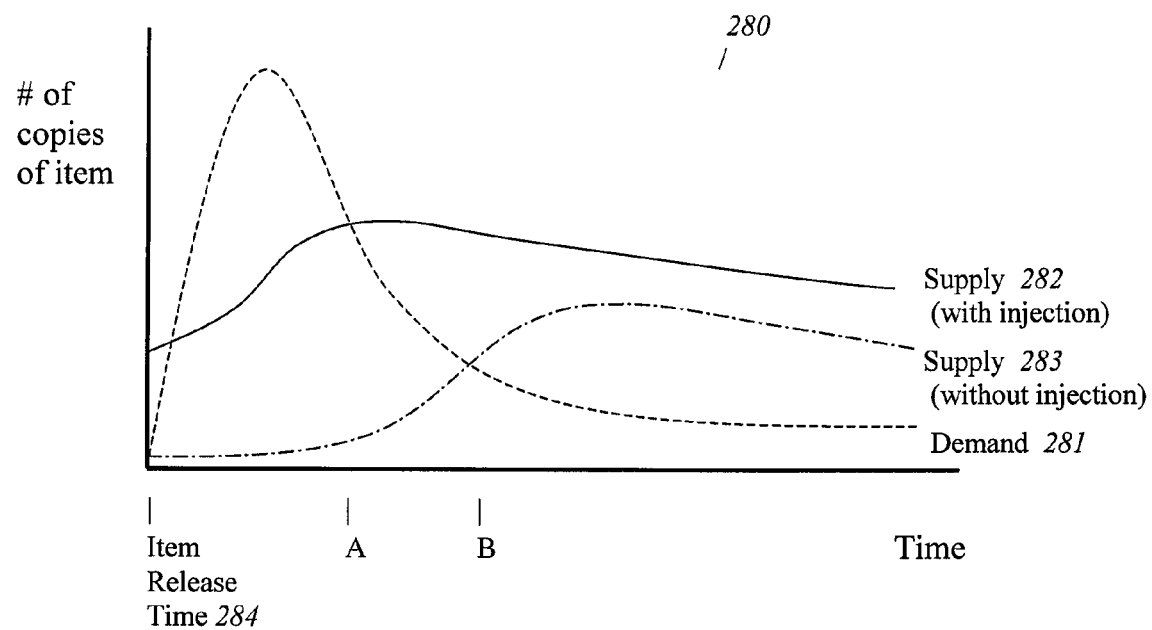

FIGS. 2A-2E illustrate examples of facilitating transactions involving items and customers of the IT system by determining when to make additional items available to customers. In particular, FIG. 2A illustrates various example information about customers of an embodiment of the IT system and about items included in transactions involving the customers, FIG. 2B illustrates various illustrative information that may be used by the IT system to determine whether to add (or "inject") additional supply of an item into the IT system, and FIG. 2C illustrates additional information about interactions of the IT system customers with other item marketplaces. For example, FIG. 2A illustrates an item database 220 used by the IT system to track items involved in transactions via the IT system, with each of the rows 221-224 representing a distinct item. Various information is illustrated for each item in this example, including a name, unique identifier ("ID"), item type, item release date, the total cumulative number of requests for the item by customers (e.g., by a customer adding the item to a desired items list for the customer), and the total cumulative number of offers of the item by customers as being available to other customers (e.g., by a customer adding the item to an available items list for the customer). For example, item WWW is shown in entry 221, and has had 103 Total Desired Listings and 20 Total Available Listings. As such, the demand for this item has greatly exceeded supply, such that a large majority of the customers who have requested the item have not had a matching customer that is willing to provide the item. The other example items XXX, YYY and ZZZ shown in entries 222-224 have had varying degrees of demand and supply, with the demand and supply for item YYY in row 223 being roughly equal, the demand greatly exceeding supply for item XXX in row 222, and the supply greatly exceeding demand for item ZZZ in row 224.

In some embodiments, a decision to inject additional supply of an item may be based at least in part on demand for the item exceeding supply, such as by at least a minimum predetermined threshold. The Item Injection Decision Information 230 in FIG. 2B illustrates a summary of at least some of the types of information that may be considered when determining whether to inject additional item supply in various embodiments. In particular, each of the rows 231-234 represent a distinct item, and in this example represent the same items previously shown in rows 221-224 of the item database 220. Various information is illustrated for each item in this example, including a name, information about projected future supply and demand for an item (e.g., for a future period of time of interest), estimated total future revenue that will be received by the IT system for each copy of the item that is injected into the IT system (e.g., for up to an indicated number of item copies), and a monetary equivalent of other estimated future benefits received for each copy of the item that is injected into the IT system (e.g., for up to an indicated number of item copies). For example, row 231 for item WWW shows 312 projected future desired listings and 214 projected future availability listings, indicating that supply is expected to continue to exceed demand for the item for the period of time reflected in the projections. Projecting future demand and supply for an item may be performed in various ways in various embodiments, as discussed in greater detail below, including based on current supply and demand, information about the type of item, and information about how long the item has been released or other available. Similarly, estimating total future revenue and other benefits for an injected item copy may be performed in various ways in various embodiments, as discussed in greater detail below, including based on an estimate on how many times each injected copy will be included in transactions involving customers (e.g., based on projected future supply and demand for the item, an expected useful life of the item, a type of the item, a likelihood that a customer receiving the item will retain the item or later make the item available for additional transactions, etc.), on an increase in customer goodwill that will result from one or more expected future transactions involving each injected item copy, etc.

In some embodiments, a decision regarding whether to inject additional supply of an item may further be based on information related to the cost of acquisition of copies of the item, such as if the injection decision is based in part or in whole on the expected profitability of the injection. Example information related to the cost of acquiring items is shown in the Item Acquisition Cost Database 240 of FIG. 2B. In particular, each of the rows 241-243 represent a distinct item, and in this example represent the same items previously shown in rows 221-223 of the item database 220 and rows 231-233 of the item injection decision information 230. Various information is illustrated for each item in the database 240 in this example, including a name and information about a price or other cost of acquisition of the item (e.g., a price and any additional fees, such as for shipping, handling, taxes, etc.) from each of one or more sources. For example, entry 241 for item WWW indicates that a current price per copy to acquire the item from an example Used Item Marketplace A is $1.50, from an example Used Item Marketplace B is $1.75, from an example New Item Marketplace C is $10.20, and from an example Auction Site D is $3.02. In this example, the possible sources of items may be of various types (e.g., with sources for used items including used item marketplaces and auction sites, and with sources for new items including new item marketplaces and optionally auction sites), and may or may not be affiliated with the IT system by having a pre-existing relationship of one or more types (e.g., being operated by the same merchant or other entity, having contractual agreements to share data and/or to provide each other with certain types of functionality or other benefits, etc.).

Using the example item injection decision information and item acquisition cost information, decisions may be made regarding whether to inject additional copies of items in various ways. For example, row 231 of the item injection decision information 230 indicates that the estimated total revenue per injected copy of item WWW is $2.05, and the item acquisition cost information indicates that copies of the item may be acquired for as low as $1.50 per copy. Based on this information, it may be profitable to acquire copies of item WWW from Used Marketplace A (or from Used Marketplace B) and inject them into the IT system, since the cost to acquire a copy of the item is less than the revenue to be expected from the item copy when injected. The number of copies of item WWW to acquire and inject may be determined in various ways in various embodiments, as discussed in greater detail below, such as based on differences between current demand and supply and/or between projected future demand and supply.

Another example of an item injection decision determination may be provided with respect to item XXX, as reflected in entries 222, 242 and 232 of the item database 220, item cost acquisitions database 240, and item injection decision information 230, respectively. In this case, the estimated total revenue per injected copy of item XXX is $1.91, but the lowest current item acquisition cost for the item is above that estimate (e.g., at $2.23 for the Used Item Marketplace A). Thus, from a pure profitability perspective, a decision may be made not to inject additional supply of Item XXX. However, in at least some embodiments additional considerations and factors may justify a determination to inject one or more copies of item XXX. For example, a value of other benefits from injecting item copies may outweigh the item acquisition costs, such as benefits corresponding to increased customer goodwill (e.g., based on acquiring and providing one or more item copies to customers generally or to one or more particular customers that desire the item), increased incentives for new customers to register with the IT system, etc. In this example, when combining an estimated other monetary benefit of $0.77 per injected copy of item XXX with the expected total revenue of $1.91 per injected copy of item XXX, the resulting sum of $2.68 does exceed the item acquisition costs of $2.23. Thus, even if not directly profitable to acquire and inject copies of item XXX, the additional benefits of injection may warrant the injection in this case.

Items YYY and ZZZ provide examples of situations in which item injection may not be warranted. With respect to item YYY, row 233 of the item injection decision information 230 shows the estimated total revenue per injected copy of the item as $0.61, which is significantly less than the cost to acquire a copy of item YYY from any of the illustrated external sources. Based on this information, a decision may be made to not inject any copies of item YYY into the IT system. Furthermore, even if it would be profitable to inject one or more item copies in this situation, a decision to not inject item copies may be made in some embodiments, since current and future demand does not exceed current and future supply of the item by a sufficient amount (e.g., such as if the IT system avoids competing with customers to supply item copies to customers who desire them). In other embodiments, items may be injected if believed to be profitable regardless of supply and demand. With respect to Item ZZZ, row 224 of the item database 220 indicates that supply greatly exceeds demand, and row 234 of the item injection decision information 230 similarly indicates that projected future supply will greatly exceed projected future demand. Accordingly, the decision may be made to not inject additional supply of item ZZZ into the IT system due to the relatively high supply.

FIG. 2D graphically illustrates an example of how demand and supply within the IT system for an item may vary over time. In this example, demand 281 for a popular newly released item within the IT system may increase rapidly after the item's release or other initial availability time 284, and then peak and gradually decrease over time, as shown in graph 280. While the specific details of demand will vary with item type and particular item, an example of an amount of time represented along the x-axis may be several days, weeks, or months. The figure also illustrates an example supply 283 of the item within the IT system based solely on customers of the IT system making the item available for transactions via the IT system, which in this example increases slowly over time after the item's release time (e.g., due to few customers having the item initially, and typically retaining the newly acquired item for a period of time before making it available via the IT system). In this example, the supply 283 does not meet the demand for the item until time B, with significant unmet demand before that time (e.g., much of the demand may eventually disappear even if customers who desire the item do not receive it, such as due to eventually losing interest amid increasing frustration over the lack of item availability). However, if an additional supply of the item is injected into the IT system at or near the time of item release, the supply with injection 282 not only meets the demand at a time A earlier than time B, but also meets much more of the demand. This may be true even if the number of item copies injected is small, as each item copy may be involved in transactions multiple times before time A (e.g., from the IT system to a first receiving customer, later from the first customer to a second receiving customer, etc.). Additional details related to one example of techniques for acquiring item copies soon after their release, such as for use in injection, are included in U.S. patent application Ser. No. 11/504,157, filed Aug. 15, 2006 and entitled "Facilitating A Supply Of Used Items," which is hereby incorporated by reference in its entirety.

Figure 2E:
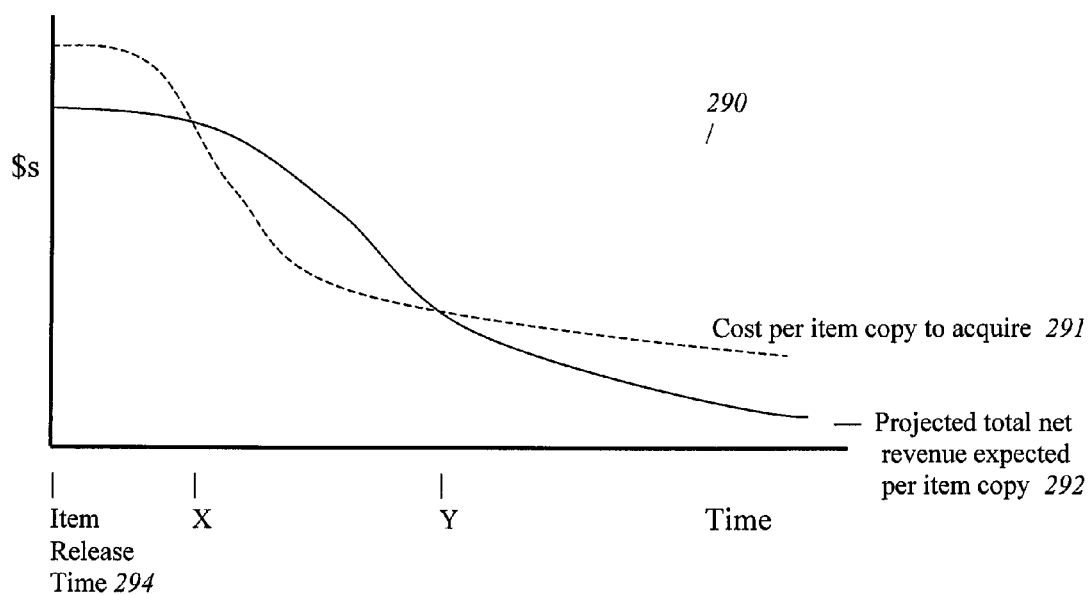

FIG. 2E graphically illustrates an example of cost-related factors over time that may be used by the IT system to decide whether to inject additional supply of an item into the IT system, such as a newly released item. Example acquisition costs 291 for a copy of an item over time are illustrated in graph 290, and in particular in this example reflect the total costs of acquiring and injecting the item copy into the IT system (e.g., to optionally include any internal processing costs of the IT system). In this example, the acquisition costs are greatest at the release time 293 of the item, and decrease over time after release time (e.g., to reflect that the price for a new copy of the item drops quickly, and/or that used copies of the item soon become available at significantly lower costs). While the specific details of price over time will vary with item type and particular item, an example of an amount of time represented along the x-axis may be several days, weeks, or months. An example of the projected total future net revenue 292 to be generated by the IT system for a copy of the item injected into the IT system is also illustrated. This total future net revenue may be influenced by various factors such as the estimated number of times that a particular injected item copy is expected to be involved in transactions between customers of the IT system, a transaction fee that may be collected by the operator of the IT system for each item transaction, and other revenue or costs over time associated with the item injection (e.g., additional advertising revenue gained related to additional item transactions). In this example, the total projected future net revenue per copy 292 is greatest at the release time 294 for the item, and decreases over time after release time. This may reflect, for example, that item copies injected near the release time may be involved in transactions more times than item copies later injected (e.g., due to demand at that time exceeding supply) and/or may have higher value for the IT system when initially released. However, while the projected revenue may be highest at item release time, expected item copy acquisition costs may also be highest at this time, and in this example exceed the projected revenue at the time of item release. Thus, if the IT system is determining to inject additional supply of an item based on whether it will be profitable, the IT system may wait until at least time X to initiate such injection, at which time the injection is expected to be until time Y (e.g., due to the acquisition costs for used item copies at that time being sufficiently low to allow the item copy injection to be profitable).

Figure 3:
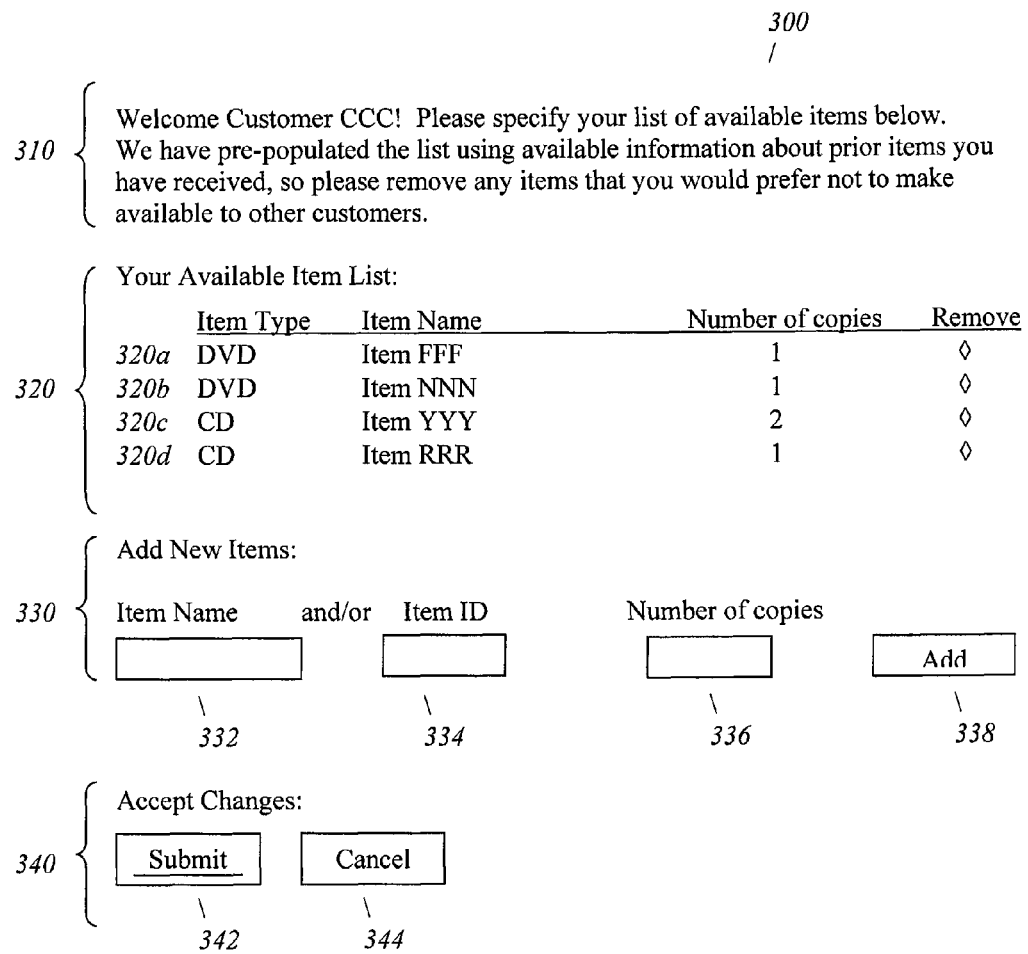
FIG. 3 illustrates an example of facilitating transactions involving items and users of an item transaction system by assisting users in specifying information related to items.

FIG. 3 illustrates an example of facilitating transactions involving items and customers of the IT system by assisting customers in specifying information to the IT system about items, such as to assist customers in identifying items that are available for transactions involving other customers. In particular, FIG. 3 illustrates an example user interface page or screen (e.g., a Web page) displayed to an example customer that is pre-populated with various information about items based on information obtained from prior interactions of the customer with one or more item marketplaces distinct from the IT system. In this example, information about prior customer interactions that may be used includes example information shown in the marketplace C purchase database 250 and marketplace A purchase database 260 of FIG. 2C. Such information may be obtained and used for each of one or more customers at various times (e.g., when the customer is initially registering with the IT system, periodically after initial registration, upon customer request, etc.) in order to assist the customer in various ways.

In this example, the user interface 300 of FIG. 3 is provided to example customer CCC when he/she is a new customer registering with the IT system or has recently performed such registration. Row 213 of the customer database 210 of FIG. 2A illustrates that at a time recently after having joined the IT system, the customer has previously provided 1 item to another IT system customer as part of an item transaction, and has not yet received any items from other IT system customers. In this example, as part of the registration process for Customer CCC, the IT system attempts to retrieve information from one or more external item marketplaces or other sources (e.g., credit card processing or other payment processing systems, shipping or delivery company systems, etc.) indicating items previously received by the customer, such as items previously purchased by the customer for him/herself and items previously purchased by others for the customer (e.g., as gifts). Example item purchase information is shown in the purchase database 250 of FIG. 2C for affiliated Marketplace C that sells new items, and in the purchase database 260 in FIG. 2C for affiliated Marketplace A that sells used items. In this example, rows 251, 252, 261 and 262 indicate four items that Customer CCC has previously received (those being items YYY, NNN, FFF and RRR), with three of the items being self-purchases. Thus, some or all of these items may be identified as items that Customer CCC has available to provide to other IT system customers, such as for items of certain types, items acquired within a specified time period (e.g., within the last year, or at least one month ago).

Accordingly, the example user interface of FIG. 3 includes information about these previously acquired items. In particular, this example user interface contains an instructions section 310, an Available Item List section 320, a section 330 for manually specifying new items to be added, and controls 342 and 344 in section 340 for accept or canceling changes, respectively. In this example, the four identified items that Customer CCC has previously received have been automatically added to the customer's available item list in section 320, as indicated in entries 320a-320d, such as to recommend those items to Customer CCC as potential or default available items that may be made available for use in transactions involving others. Each entry has an associated "Remove" user-selectable control that Customer CCC may use to remove the item from the Available Item List, such as if Customer CCC no longer has the item or would prefer to retain the item at this time. In this manner, the time and effort for Customer CCC to specify items to add to the customer's Available Item List is greatly minimized, and in some situations may involve no actions by the customer (e.g., if all of the automatically added items are correct, and the customer does not have any additional items to add).

In this example, Customer CCC may also manually specify additional items for the Available Item List using the user-selectable controls 332, 334, 336 and 338 in section 330, such as for items for which the IT system did not automatically obtain information or did not automatically select as a likely item that the customer would like to make available. Even in this situation, the information specification by the customer may be minimized if the customer is able to specify a unique identifier 334 for an item being added that allows the IT system to automatically retrieve relevant information about the item (e.g., item name, type, release date, etc.). Such a unique identifier may, for example, correspond to a unique identifier used by one or more external marketplaces or other information sources (e.g., an affiliated marketplace or other source), and if so, information about the item may be obtained from those marketplaces or other information sources using the unique identifier. Thus, relevant information about such an item may be automatically retrieved and used if available. Alternatively, the customer may manually indicate an item name 332 and various other item information (e.g., item type, condition, etc., not shown). After identifying the item and indicating a number of copies 336, the customer may use the user-selectable control 338 to add the item to the Available Item List. In other embodiments, however, the user may not be allowed to indicate more than one copy of an item in the Available Item List. Similarly, in some embodiments a user may not be allowed to request multiple copies of an item in a desired item list, such as to prevent a small number of users from acquiring a large amount of the supply for a particular item.

While not illustrated here, in at least some embodiments various user-selectable controls may further be displayed to allow a user to sort, filter or otherwise organize the display of his/her available item list in various ways. For example, a user may be provided with controls to sort items in the available item list by one or more relevance metrics, such as the following: a value of the items as part of transactions via the IT system, an amount of time that an item has been present on the available item list, an amount of time that an item has been publicly available, a number of copies of the item that the user has available, a popularity of the item with the IT system (e.g., based on a number of prior transactions involving the item, based on a number of users that currently desire the item, based on a number of other users that currently have the item available to provide, etc.), a type of the item, a name of the item, etc. Moreover, in some embodiments, the display of items on a user's available item list may similarly be sorted, filtered or otherwise organized in an automated manner, such as based on one or more of the relevance metrics mentioned above. Thus, for example, a user's item available list may be automatically ordered to show the most popular items on the list first, such as based on current demand for the items as indicated by other users' desired item lists. In addition, similar user-selectable controls for and/or automated techniques may similarly be provided in some embodiments for other types of information associated with users, including desired item lists.

It will be appreciated that these various sections of the example user interface shown in FIG. 3 may be omitted or rearranged or adapted in various ways in other embodiments, and that additional types of information may be added. In addition, in some embodiments such information may be provided to customers in other ways (e.g., via email, instant message, SMS, telephone call, etc.).

In addition, while not illustrated here, in some embodiments the IT system may automatically assist each of one or more customers in specifying information to the IT system about items that the customer desires to purchase from the IT system. For example, the IT system may provide this assistance by automatically retrieving information from one or more external marketplaces or other information sources that may be used to identify items that may be desired by the customer. Such information may include information about items that the customer has acquired for him/herself (e.g., to identify similar or complementary items), about items that the customer has acquired for others (e.g., to identify those items and/or similar or complementary items), about items in which the customer has expressed an interest (e.g., by adding the item to a wish list or gift registry, by adding the item to other types of lists or blogs or other groups of information about items, by reviewing or otherwise commenting favorably on, etc.), etc. For example, the possible item acquisition database 270 of FIG. 2C displays one example of information from an affiliated used item marketplace A (e.g., based on one or more of the types of information above) that the IT system may retrieve and use to provide such assistance. More generally, items may be recommended for the customer in a variety of ways based on prior activities of the customer and/or other information about the customer, and such recommended items may be used to assist a customer in specifying information to the IT system about desired items (e.g., by automatically adding some or all of those items to a desired item list for the customer, such as for use as default recommendations that the customer may remove if the items are not desired). As with the example user interface for specifying available item list information, a user interface for specifying a desired item list may include a variety of types of information and be presented in various ways, including via one or more Web pages, emails, instant messages, SMS messages, telephone calls, etc.).

Figure 4:
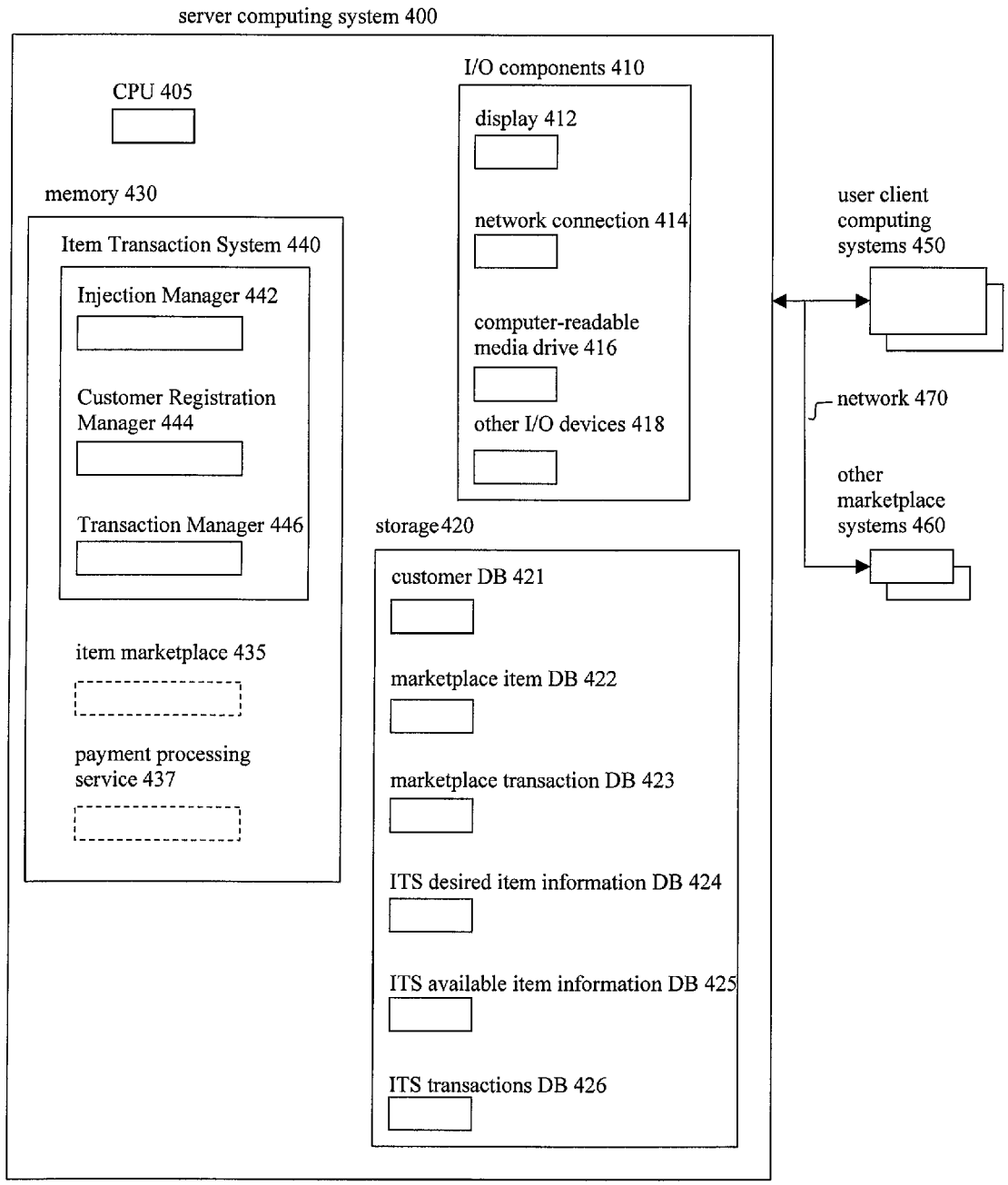
FIG. 4 is a block diagram illustrating a computing system suitable for executing an example embodiment of an item transaction system to provide the described techniques.

FIG. 4 illustrates an example server computing system 400 that is suitable for executing an embodiment of the Item Transaction system 440. The server computing system includes a CPU 405, various input/output (I/O) components 410, storage 420, and memory 430. The illustrated I/O components include a display 412, a network connection 414, a computer-readable media drive 416, and optionally other I/O devices 418 (e.g., a keyboard, mouse, etc.). FIG. 4 also illustrates multiple client computing systems 450 which users may use to interact with the Item Transaction system via a network 470 (e.g., the Internet). The Item Transaction system may also interact over the network with one or more computing systems 460 for one or more external item marketplaces or other external sources of information, such as to retrieve customer and/or item information, and/or to place orders for items being acquired for injection.

An embodiment of the Item Transaction system 440 is executing in memory 430, and in this example includes a Customer Registration Manager component 444, an Injection Manager component 442, and a Transaction Manager component 446. The memory 430 may also optionally include one or more executing item marketplace systems 435 (e.g., affiliated used and/or new item marketplaces operated by the same entity operating the Item Transaction system) and/or an executing payment processing service 437, or may instead interact with other such systems remotely over the network. If present, one or more item marketplace systems may each store various information about available items, customers, and completed transactions in databases (or "dbs") on storage 420, such as the marketplace item db 422, the customer db 421, and the marketplace transaction db 423, respectively.

The Customer Registration Manager component 444 interacts with users to provide various functionality, such as to register users as customers and to allow them to manage their accounts, and may obtain and store various customer information in the customer database 421 on storage 420. In the illustrated embodiment, if one or more affiliated marketplace systems are executing in memory, the Item Transaction system shares a common customer database with those marketplace systems, although in other embodiments independent customer databases may instead be used (and some or all information for users who are common customers for the multiple systems may be copied between the multiple databases). The Customer Registration Manager may further use various information from external marketplaces to facilitate interactions with customers, such as to assist customers in creating available item lists and desired item lists, and may store such information in the available item information database 425 and desired item information database 425 on storage 420, respectively.

The Transaction Manager component 446 provides functionality to allow item transactions involving customers to occur. In particular, the component identifies customers who desire items and identifies other customers who have those items available, so that the Transaction Manager component may engage in item transactions to purchase items from customers who have items available and to sell items to customers who desire items. The purchase and/or sell item transactions of the Transaction Manager component may be initiated in various ways, such as in response to requests from customers who are willing to provide items, in response to requests from customers who desire to receive items, and/or by analyzing desired item lists and available item lists. The Transaction Manager component may also take various additional actions to facilitate the purchase and/or sell item transactions, such as by obtaining any corresponding fees and other payments, managing any points being credited or debited, providing instructions and/or shipping materials to enable the item transactions to occur, and tracking the progress of the item transactions. The component may further in some embodiments facilitate item transactions by taking physical custody of items being provided from customers and then providing those items to the customers who desire to receive them. In performing its operations, the component may access and use information from the available item information database 425 and desired item information database 425, and may store information regarding item transactions in the IES transactions database 426 on storage 420.

The Injection Manager component 442 operates to determine when to inject additional supply of one or more copies of an item into the IT system, and to then perform those item injections by acquiring item copies (e.g., from one or more of the marketplaces 435 or 460 or from other item sources) and making them available to customers who desire those item copies. The injection decisions may be based at least in part on information from the available item information database 425 and desired item information database 425 (e.g., to determine demand and supply for items), item information (e.g., pricing and availability information) from the item database 422 and/or from one or more marketplaces or other item sources, customer information from the customer database 421 (e.g., information related to possible customer goodwill benefits for some or all customers based on item injections), information that is calculated or retrieved related to expected future revenue from injecting an item copy, etc. The component may operate at various times, such as periodically (e.g., once a day), when requested by the Item Transaction system and/or a customer, etc.

It will be appreciated that computer systems 400, 450 and 460 are merely illustrative and are not intended to limit the scope of the present invention. The Item Transaction system may instead be executed by multiple interacting computing systems or devices, and computing system 400 may be connected to other devices that are not illustrated, including through one or more networks such as the Internet or via the World Wide Web ("Web"). More generally, a "client" or "server" computing system or device may comprise any combination of hardware or software that can interact, including (without limitation) desktop or other computers, network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the discussed system components may in some embodiments be combined in fewer components or distributed in additional components. Similarly, in some embodiments the functionality of some of the components may not be provided as part of the Item Transaction system and/or other additional functionality may be available. For example, in some embodiments a system separate from an Item Transaction system may perform some or all of the described techniques, such as to support one or more external item transaction systems or other systems (e.g., for a fee).

It will also be appreciated that, while various items are discussed or illustrated as being stored in memory or on storage while being used, these items or portions of them can be moved between memory and other storage devices for purposes of memory management and data integrity. Alternatively, in other embodiments some or all of the software components may execute in memory on another device and communicate with the illustrated computing system via inter-computer communication. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted via generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 5:
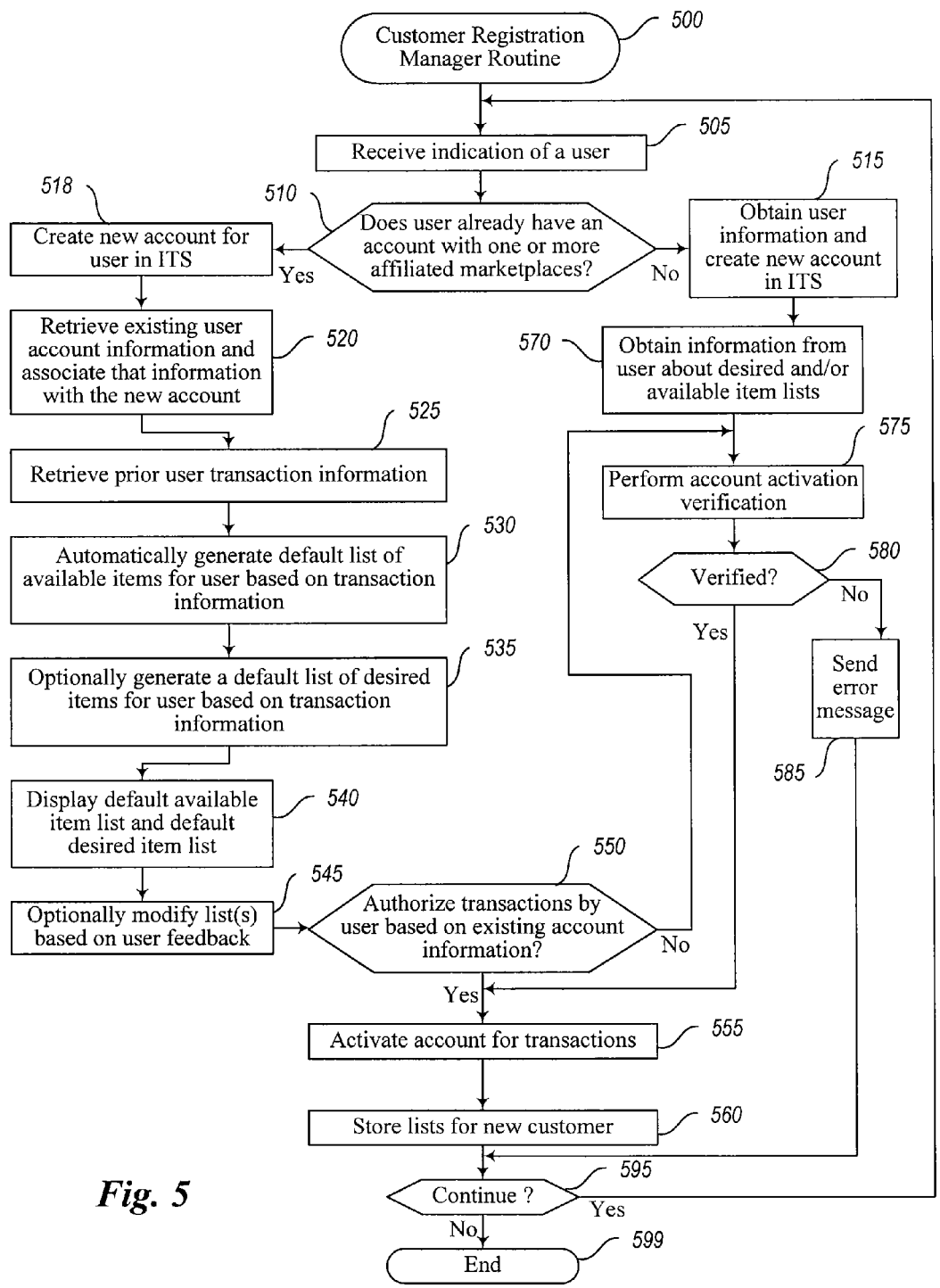
FIG. 5 is a flow diagram of an example embodiment of a Customer Registration Manager routine.

FIG. 5 is a flow diagram of an example embodiment of a Customer Registration Manager routine 500. The routine may be performed by, for example, execution of the Customer Registration Manager component 444 of FIG. 4, such as to register users as customers. While not illustrated here, in other embodiments this or another routine may further allow existing customers to interact with and manage their accounts, such as to change information about desired and available items.

The routine begins at step 505, where an indication is received of a user who is a potential IT system customer. The routine continues to step 510 to determine if the user already has an account with one or more marketplaces that are affiliated with the IT system. If so, then the routine continues to step 518 to create a new IT system account for the user, although in some other embodiments the IT system may instead share a user account with the one or more affiliated marketplaces. The routine then continues to step 520 to retrieve existing user account information from at least one of the one or more other marketplaces where the user already has an account, and to associate that information with the new IT system account for the user. The routine then continues to step 525 to retrieve information indicating prior transactions and other interactions by the user in the one or more other marketplaces where the user already has an account, including transactions in which the user purchased or otherwise received one or more items. The routine then continues to step 530 to automatically generate a default list of available items for the user based on the prior transaction information retrieved in step 525, and in step 535 optionally generates a default list of desired items for the user based on the prior transaction information retrieved in step 525. The routine then continues to step 540 to display the default available item list and the default desired item list for use by the new user, such as to allow the user to modify the lists. While not illustrated here, the routine may further display some or all of the retrieved account information (e.g., legal name, contact information, payment-related information, etc.), such as to allow the user to optionally modify that information. The routine then continues to step 545 to allow the user to optionally give feedback requesting changes to the default available item list and the default desired item list, and modifies those lists as appropriate based on any such feedback.

After step 545, the routine continues to step 550 to determine whether to automatically authorize immediate item transactions by this user based on information from the user's existing accounts in the one or more other marketplaces where the user already has an account. For example, if valid payment information is available and the user has a history of successful payment, the user may be authorized without obtaining pre-payment for any transactions fees. If it is determined that transactions are authorized, the routine continues to step 555 to activate the user's IT system account for transactions, and in step 560 stores the current information for the user's available item list and the desired item list in a manner that will enable that information to be used for item transactions. The routine then proceeds to step 595 to determine whether to continue, such as based on whether there are indications of additional users who wish to register and become customers of the IT system, or whether the routine will wait to receive such indications. If so, the routine returns to step 505, and if not proceeds to step 599 and ends. In some embodiments, the activating of an account for transactions may be based on the user agreeing to financial and/or other conditions, such as to pre-pay a specified amount of money (e.g., to pay for a certain number of transactions) and/or signing up for a subscription for a specified period of time and/or a specified number of transactions. As one example, one type of subscription may allow an unlimited number of transactions to occur during a particular period of time (e.g., a month) for a particular fee. Alternatively, in some embodiments and situations, at least some users may instead pay for at least some transactions on a per-transaction basis, such as at a time of each transaction. Furthermore, in some circumstances, information regarding a user's interactions with the IT system may be stored as part of multiple accounts, such as to use one account to correspond to a subscription or other financial status, and to use another account for other information (e.g., lists of available and desired items).

If it was determined instead in step 510 that the user does not already have an account with one or more affiliated marketplaces, the routine then proceeds to step 515 to obtain various user information from the user (e.g., legal name, username, contact information, payment-related information, etc.) and to create a new account in the IT system for the user. The routine then continues to step 570 to obtain manually specified information from the user about desired items to add to the user's desired item list and about available items to add to the user's available item list. After step 570, or if it was determined in step 550 that transactions by this user were not authorized based on existing account information, the routine proceeds to step 575 to attempt to perform activation and verification of the user's IT system account, such as by verifying the payment-related information from the user is valid, by obtaining payment for one or more pre-paid transaction fees, etc. In some embodiments, this step may also include obtaining payment for a subscription plan that will allow a specified number of transactions under specified circumstances (e.g., allow the user to conduct only a particular number of transactions, to conduct an unlimited number of transactions for a particular period of time, to conduct a particular number of transactions for a particular period of time, etc.). Further, as previously noted, in some embodiments such subscription-related or other payment-related information may be stored in a separate account for a user from other information for the user. The routine then continues to step 580 to determine whether account verification is successful. If so, the routine continues to step 555, and if not proceeds to step 585 to send an error message. In this example embodiment, the customer will not be able to participate in the IT system until their account is activated, and thus the routine does not store any available item list information and/or desired item list information in a manner that it will be used by the IT system for item transactions. The routine then continues to step 595.

It will be appreciated that various of the illustrated types of customer registration manager functionality may not be used in other embodiments, and that a variety of additional types of functionality may be available.

Figure 6:
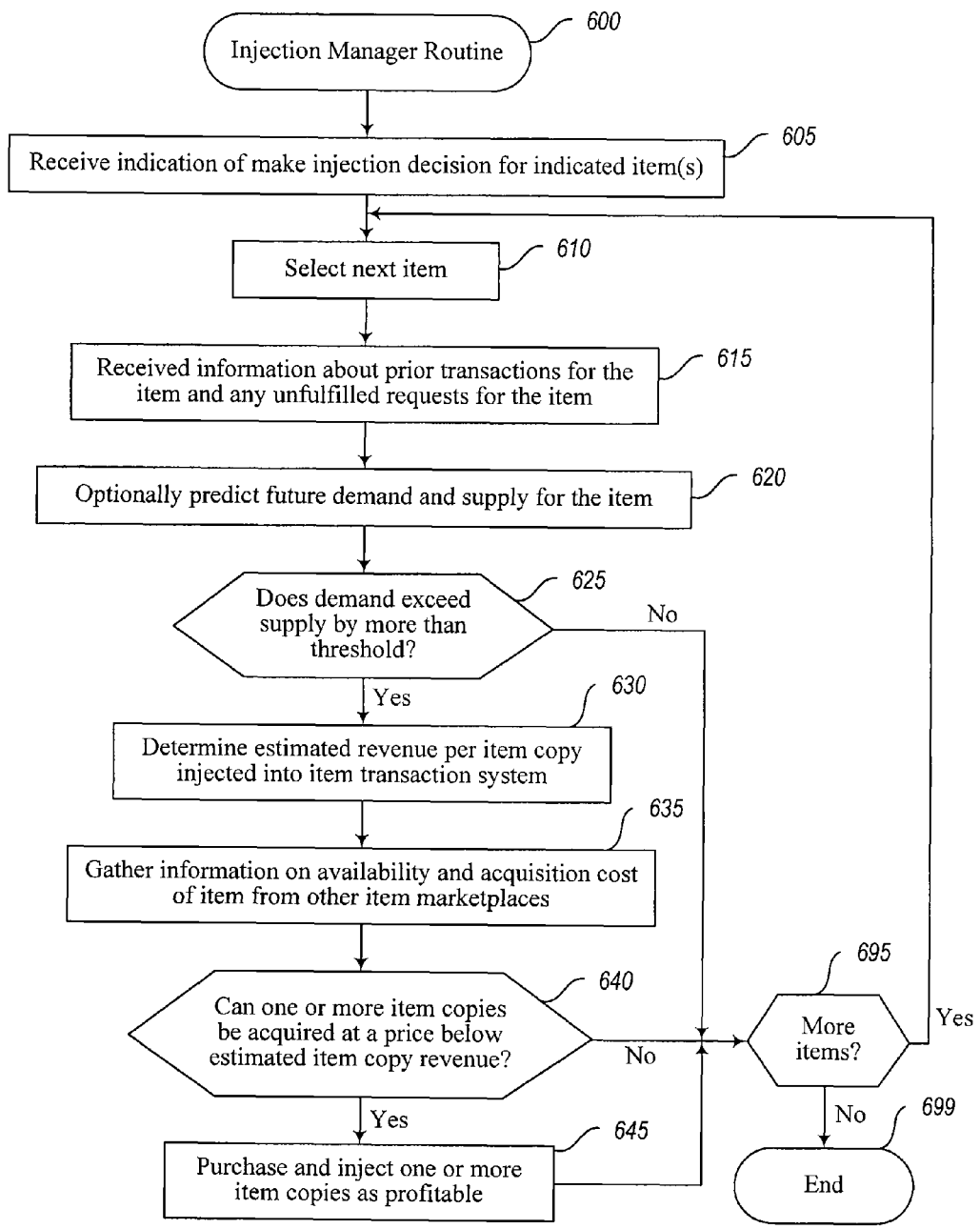
FIG. 6 is a flow diagram of an example embodiment of an Injection Manager routine.

FIG. 6 is a flow diagram of an embodiment of the Injection Manager routine 600. The routine may be performed by, for example, execution of the Injection Manager component 442 of FIG. 4, such as to determine when to inject additional supply of one or more copies of an item into the IT system, and to then perform those item injections by acquiring item copies.

The routine begins at step 605, where an indication is received to make a decision whether to inject additional supply of one or more items into the IT system. The routine continues to step 610 to select an item for which to make an injection decision, such as a particular item indicated in step 605, or one of the items that may be involved in transactions via the Item Transaction system if no particular items were indicated in step 605. The routine then continues to step 615 to optionally receive information about any prior item transactions for the item, any unfulfilled requests for the item (e.g., based on the item being on one or more users' desired item lists), and any available copies of the item via the Item Transaction system (e.g., based on the item being on one or more users' available item lists), although in some embodiments and situations some or all of this information may not be used. For example, in some embodiments injection decisions are not based on information about particular items (and thus information about prior transactions for those items may not be used), such as if a decision is made on a IT system-wide basis regarding a number of items to acquire and/or an amount of money to spend on item acquisitions, such as to reflect expected overall profitability or other benefit to be obtained from such injections. Such decisions regarding number of items to acquire may further in some embodiments be made specific to particular types of items, such as to inject only CDs even if other types of items are involved in transactions via the system (e.g., based on those types of items being more profitable for transactions). After deciding the total number of items and/or total amount of money to be spent, the decision as to which items to inject may be made in various ways, including based on particular items and/or with respect to particular users. For example, particular items may be selected based on the amount of demand for those items relative to supply for those items, without considering profitability regarding injections specific to those items. Furthermore, in some embodiments particular items may be selected based on particular users that desire items, such as to ensure that new users are supplied with at least some items that they desire (e.g., by acquiring those items from external sources and providing those acquired injected items to those users), to ensure that preferred users (e.g., users that have paid for premium functionality, that have achieved certain levels of longevity and/or numbers of transactions, etc.) receive at least some items, etc. In addition, in some embodiments items may be injected for particular users regardless of profitability of the items, such as for new and/or preferred users. In the illustrated embodiment, the routine next proceeds to step 620 to optionally predict future demand for and supply of the item in the Item Transaction system based in part on information received in step 615. For example, in some embodiments the routine may make injection determinations without using predicted or projected future demand and supply (e.g., based on current demand and supply and/or other factors), or instead may use predicted or projected future demand and supply in addition to one or more other factors.

The routine continues to step 625 to determine whether current and/or future demand for the item exceeds current and/or future supply of the item, such as by more than a threshold amount (e.g., a predetermined number of copies, such as based on the type of the item). If so, the routine proceeds to step 630 to optionally determine the estimated future revenue that may be generated for each copy of the item injected into the IT system, although in other embodiments the determination may not be made based on profitability-related factors and the step may not be performed. The routine then continues to step 635 to gather information on the availability of the item in one or more other item marketplaces, and the cost to acquire copies of the item from such other item marketplaces. The routine then continues to step 640 to determine whether one or more copies of the item can be acquired at a price below the estimated future revenue that may be generated from each injected item copy. If so, the routine proceeds to step 645 to purchase (or otherwise acquire) one or more item copies for one or more external marketplaces or other item sources, and to inject them into the IT system (e.g., by directing the marketplace or other item source to send each item copy being acquired to an IT system user who desires the item). After step 645, or if it was determined in step 625 that item demand does not exceed item supply by more than a threshold, or in step 640 that one or more copies of the item cannot be acquired at a price below the estimated revenue for a copy, the routine proceeds to step 695 to determine whether there are more items for which to make an injection decision. If so, the routine returns to step 610, and if not proceeds to step 699 and ends.

It will be appreciated that, in other embodiments, decisions regarding when and how to inject item copies may be made in other manners (e.g., by considering other factors as part of the decisions), that some of the types of described functionality may not be used, and/or that a variety of additional types of functionality may be available (e.g., estimating the value of customer goodwill that will be gained if copies of a certain item are injected into the IT system).

Figure 7:
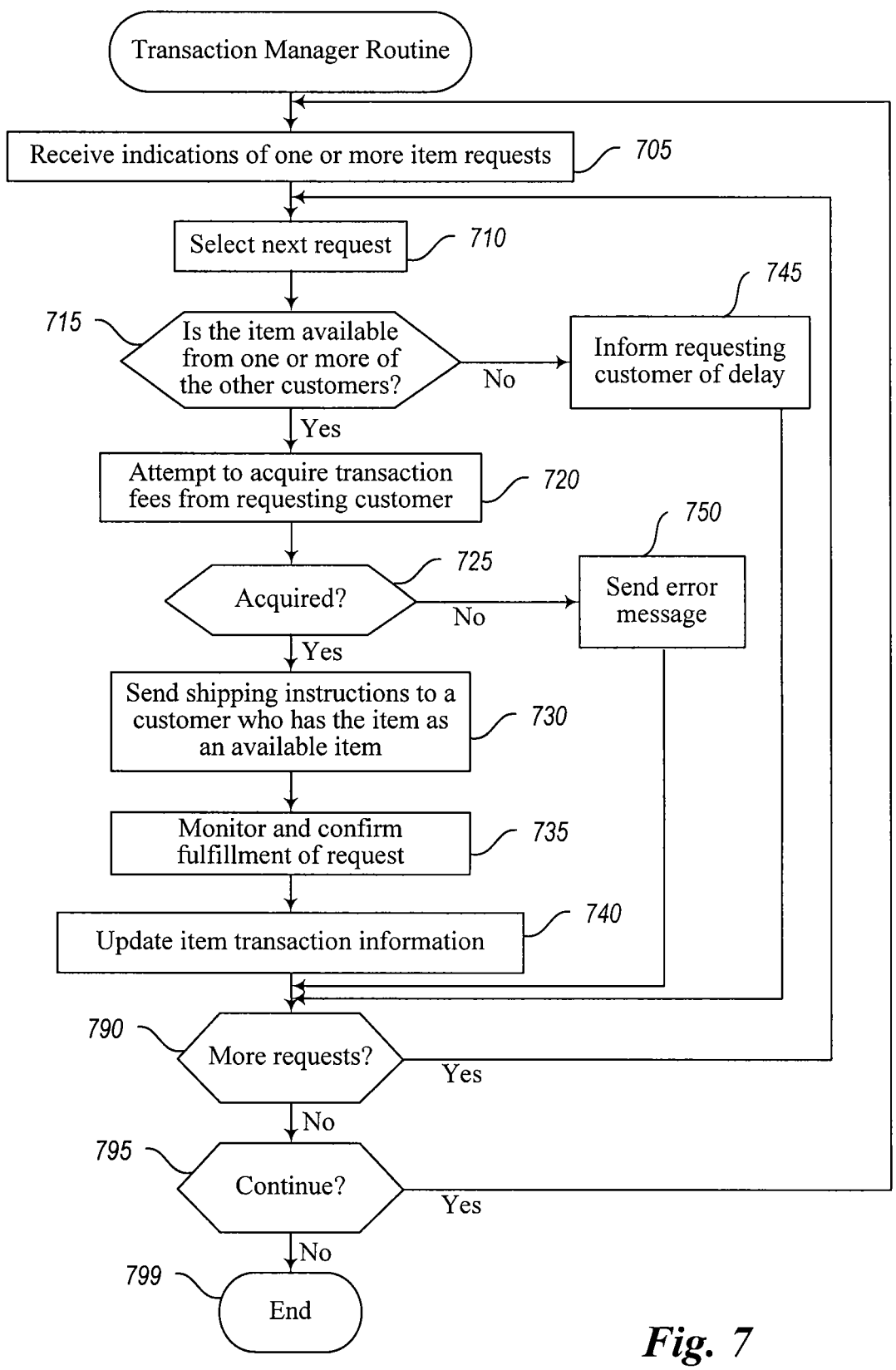
FIG. 7 is a flow diagram of an example embodiment of a Transaction Manager routine.

FIG. 7 is a flow diagram of an embodiment of the Transaction Manager routine 700. The routine may be performed by, for example, execution of the Transaction Manager component 446 of FIG. 4, such as to facilitate item transactions between customers of the IT system. In this example embodiment, the routine is initiated by a request from a customer who desires an item (e.g., by placing the item on the desired item list of the customer).

The routine begins at step 705, where an indication is received of one or more requests made by one or more customers of the IT system of items desired to be received. The routine then continues to step 710 to select a request to be processed. The routine then continues to step 715 to determine whether at least one copy of the item requested is available from one or more of the other customers of the IT system. If so, the routine proceeds to step 717 to identify a particular customer who has the item available to participate in the transaction, such as by soliciting one or more such users regarding their interest in participating. After the user is identified, the illustrated embodiment of the routine continues to step 720 to attempt to acquire a corresponding transaction fee for the item transaction from the requesting customer. The routine then continues to step 725 to determine whether the transaction fees were successfully acquired. If so, the routine proceeds to step 730 to send shipping instructions to the customer identified in step 717 who has a copy of the item available, so as to cause the item to be sent to the requesting customer. In other embodiments, the routine may instead not attempt to acquire transaction fees before initiating the providing of an item to the user, such as if the user will later be billed (e.g., if multiple fees are aggregated and billed together). The routine continues to step 735 to monitor and confirm that the request was fulfilled and that the requesting customer received a copy of the item. The routine continues to step 740 to update the item transaction information (e.g., to create an entry containing information about the transaction in the IT system transactions DB 426 as shown in FIG. 4, and to update the desired item list and the available item list of the customers involved in the item transaction).

After step 740, the routine proceeds to step 790 to determine whether there are more item requests to be processed. If so, the routine returns to step 710 to select the next item request to process, and if not continues to step 795 to determine whether to continue. If so, the routine returns to step 705, and if not proceeds to step 799 and ends.

If in step 715 it is instead determined that no copy of the item is available from another customer of the IT system, the routine proceeds to step 745 to inform the requesting customer that there may be a delay in fulfilling the customer's request for the item. In some embodiments, additional steps may be taken, such as to initiate a decision regarding whether to inject additional copies of the item, to provide information to the requesting customer regarding alternative ways to acquire a copy of the item (e.g., by providing item acquisition information for one or more affiliated marketplaces), etc. The routine then continues to step 790. If in step 725 it is instead determined that the transaction fees are not successfully acquired from the requesting customer, the routine proceeds to step 750 to send an error message to the customer. The routine then continues to step 790 to determine whether there are more item requests to be processed.

It will be appreciated that, in other embodiments, some of the illustrated types of functionality may not be provide, and that various additional types of functionality may be available.

As previously noted, operation of the IT system may be enhanced in various ways based on various types of interactions with and information from one or more external marketplaces or other systems. Additional details related to such operation and interactions are included below. As previously noted, a user who desires to participate in the IT system (e.g., to become a new customer of the IT system, if the IT system sells or otherwise provides functionality for a fee) may be requested to provide a variety of types of information to enable such participation, and the IT system may further take additional types of actions to assist such users. For example, the providing of the information by a user may include interacting with a Web site provided by the IT system in order to complete an initial registration process. The registration process may involve the IT system obtaining information about, for example, the user's name, various contact information (e.g., home street address, telephone number, email address, etc.), and/or demographic information (e.g., age). The registration process may also involve the IT system obtaining various payment-related information for the new user, such as if users are charged monetary payments in certain circumstances (e.g., to charge a user who obtains an item from another user a monetary transaction fee, such as to cover costs of shipping or other delivery and/or as part of a fee charged by the IT system for facilitating the item transaction). Such payment-related information for a user may include information about, for example, one or more credit cards, bank accounts, electronic payment system accounts, etc. During or after the registration process, the new user may also be prompted to optionally specify an available item list describing the items that the user wishes to make available to others via the IT system, and a desired item list describing the items that the user desires to receive from other users via the IT system. A variety of other types of information may similarly be specified by a user during or after the registration process (e.g., various types of feedback, such as regarding other users with whom the user conducts item transactions and/or regarding the IT system).

In the absence of automatic assistance to specify user information to the IT system, a new user may spend a significant amount of time manually specifying each of the types of information mentioned above. However, in at least some embodiments, the IT system may automatically assist a user in specifying at least some of types of the information described above, such as based on prior interactions of the users with one or more item marketplaces separate from the IT system. For example, after receiving an indication related to an identity of a user (e.g., an online username, full legal name, associated number such as a credit card number or social security number, etc.), the IT system may automatically interact with one or more other item marketplaces in order to obtain information about prior interactions of the user with that item marketplace. Such information obtained from one or more other item marketplaces may then be automatically used by the IT system in various ways. For example, the obtained information may include the user's legal name, contact information, demographic information and/or payment-related information, thus eliminating any requests to the user to supply that information, or instead using the obtained information as default information that the use may change only if so desired. Furthermore, the obtained information may include various user preference information that may be of use to the IT system (e.g., preferences regarding how much information is displayed together, how notifications or other types of information are sent to the user, etc.).

As another type of automatic assistance based on information from one or more item marketplaces, information about a user's assessed reputation or history of interactions with the other item marketplaces may be obtained and used. Such prior interaction history may include various types of actions of interest, such as making payments on time, being a user for a minimum amount of time, having engaged in a minimum amount of transactions, not having credit card or other payments be rejected, not having excessive returns, not having suspected fraudulent transactions, etc. If such reputation or prior interaction history is sufficiently positive (e.g., by including one or more desired factors, having a score above a predetermined threshold when combined in a weighted manner, etc.), the IT system may immediately authorize the user to engage in item transactions via the IT system, such as without obtaining pre-payment from the user. Alternatively, in the absence of such sufficiently positive information (or in the presence of sufficiently negative information), the IT system may instead take one or more of a variety of types of restrictive actions (e.g., requiring that the user pre-pay transaction fees before allowing the user to engage in corresponding transactions to which those fees apply, limiting the types of transactions in which the user may participate for an initial period of time, preventing the user from participating in any item transactions via the IT system, etc.).

Furthermore, another type of automatic assistance based on information from one or more item marketplaces includes, in at least some embodiments, using information about a user's item purchases and other item acquisitions, as well as feedback provided related to items. Such information may be used in various ways, including to automatically assist the user in populating an available item list of items that the user is willing to provide to other users via the IT system. For example, information may be obtained about items that the user has received (whether from self-purchases and/or from others), such as during a prior time period of interest or at any time in the past. Some or all of those items that the user has received may then be recommended to the user for inclusion on the user's available item list, such as by automatically adding those items to the available item list as default entries that the user may later remove if so desired. Items may be selected for recommendation in various ways, such as to limit the recommended items to those that are of one or more types involved in transactions by the IT system, to select items that are expected to have a high value and/or to be in high demand, to select items for which the user is believed to have dissatisfaction (e.g., based on explicit feedback about the items, by later acquiring a newer related item that may have replaced the item, etc.), etc. Similarly, information about a user's item acquisitions and/or item feedback may be used in at least some embodiments to automatically assist the user in populating a desired item list of items that the user desires to receive from other users via the IT system. For example, prior item acquisitions of the user may be used to recommend additional items that may be of interest to the user, such as similar or complementary items. In addition, various types of user feedback may be used to further make such recommendations, such as based on feedback from the user that indicates that a type of item or particular item is of particular interest (e.g., by placing an item on a wish list of the user or other list indicating interest, by providing comments related to a type of item that indicates an interest in that item type, etc.). As with the available item list, recommendations for a desired item list may be provided to a user in various ways, including by automatically adding the recommended items to the desired item list as default entries that the user may later remove if so desired. Furthermore, for item marketplaces that are affiliated with the IT system, the item marketplace may in some embodiments explicitly include functionality to allow users to specify items to include on their available item list and/or desired item list for the IT system (e.g., by including user-selectable controls when information about an item at the item marketplace is displayed or otherwise provided to users who are customers of the IT system, such as a user-selectable control for each of adding the item to the user's available item list and adding the item to the desired item list, or instead user-selectable controls to otherwise modify the user's available item list and/or desired item list for the IT system). If so, any such user-specified information at the item marketplace may be provided to and used by the IT system, whether by the IT system retrieving the information at one or more times or by the item marketplace sending the information to the IT system.

When using such information from other marketplaces, the other marketplaces from which the information is obtained may include, for example, marketplaces that are affiliated with the IT system, such as based on a pre-existing agreement to share information and/or by being operated by a single entity. In addition, in some embodiments, such information retrieval from one or more other item marketplaces may be performed if approved by the user, such as by requesting the user during IT system registration to provide user identity information corresponding to one or more indicated marketplaces (e.g., a username and password used at each indicated marketplace), while in other embodiments the information retrieval and use may not include such explicit user approval.

A variety of types of items may be involved in transactions in various embodiments of the IT system, such as one or more of CDs, DVDs, computer software, video games, books, articles of clothing, shoes, fashion accessories, photographs, magazines or other printed materials, posters, works of art, furniture, cooking recipes, rare collectibles, electronics or computer hardware, etc. In some embodiments, the types of items may include any type of item that is offered by one or more affiliated marketplaces.

As previously noted, in some embodiments users of the IT system may be charged transactions fees in certain circumstances, and further may in some embodiments receive and provide IT system "points" (or other private transaction currency issued by the IT system or other system) as part of item transactions. A user of the IT system may in some embodiments purchase additional points (e.g., by paying government-issued monetary currency to the IT system, via credit card, bank account, or other monetary transaction). Furthermore, the IT system may in some embodiments allow or require at least some customers to pre-pay for some transactions in advance, and may further in some embodiments automatically perform pre-payment for one or more transactions and/or one or more points under certain circumstances (e.g., if the user's current available number of pre-paid transactions and/or points is at or below a certain predetermined amount). In some embodiments, the points that a customer expends to receive an item or gains by providing an item may depend on the demand for that item in the IT system, or the value of the item as determined in one or more other ways (e.g., its value in one or more other item marketplaces, auction sites, or other sources of items). For example, in some embodiments, the points for an item may depend on whether the item is categorized as a "new release," or otherwise on how long the item has been available for purchase or acquisition by the general public. In some embodiments, a new customer of the IT system may automatically receive a certain number of points and/or certain number of free transactions. In addition, a transaction fee for an item involved in a transaction may be charged to a user at various times, such as after the item has been sent from a providing user but before it is received by the receiving user, or instead after it is received by the receiving user. The IT system may further track item shipments in various ways in some embodiments so that the tracking information may be used to determine when to charge a transaction fee.

In addition, in some embodiments, the facilitating of item transactions between users includes automatically making additional copies of one or more items available to users of the IT system under certain circumstances (e.g., based on demand for those items by users of the IT system exceeding supply of those items from users of the IT system), such as by acquiring copies of those items from one or more item marketplaces. In some embodiments, the IT system may automatically determine to inject additional supply of a certain item, in the form of additional copies of the certain item, into the IT system based at least in part on demand from customers for the item exceeding supply of the item from customers by at least a predetermined amount. Injection of the additional supply may include acquiring one or more copies of the specified item from one or more external sources such that each of at least one of the one or more customers who requested the specified item is sent one of the acquired copies of the item. In some embodiments, the one or more external sources from which copies of the item to be injected are to be acquired may include marketplaces for the sale of used or new items, or auction sites for new or used items. In some embodiments, the operator of the IT system may also operate one or more of the external sources, such as marketplaces from which copies of the item to be injected are to be acquired. In some embodiments, the one or more external sources such as marketplaces may be affiliated with the operator of the IT system so that the IT system and the one or more external sources may share information with one another. In some embodiments, item injection may further be performed in other manners, including by providing various incentives to current or potential customers to make particular items available (e.g., by providing additional points for making those items available, by waiving fees and/or providing monetary compensation, etc.).

In some embodiments, the decision to inject additional supply of an item into the IT system may be made when the delay in providing a copy of the item to one or more customers who desire the item exceeds a predetermined length of time, or when such injection is determined to be profitable to the operator of the IT system. In some embodiments, the decision may be made to inject supply of an item into the IT system despite being unprofitable to the operator of the IT system, such as if such injection will create benefits (e.g., goodwill among the IT system customers or an increased likelihood that prospective customers will register with the IT system). For example, the IT system may determine a monetary value equivalent of such benefits, and use that value as part of a profitability analysis to decide whether to inject supply of an item into the IT system. In some embodiments, the operator of the IT system may bypass the automated injection process and choose to inject supply of an item into the IT system regardless of profitability or any less tangible benefits of injection.

In some embodiments, the IT system may charge some or all users a fee that allows those users to receive a certain predetermined number of items without paying any additional transaction fee, or entitles those users to receive items for a certain predetermined period of time without paying any additional transaction fee, or entitles those users to receive items without ever paying any additional transaction fee. In addition, in some embodiments, the IT system may provide functionality to allow one or more users to form themselves into a private community within the IT system so that each of those users can only receive items from and/or provide items to other users who are part of the same private community, such as based on fees from some or all of those users.

In some embodiments, the IT system functionality may further be used to implement a rental system, such that some or all users who provide items may eventually receive that item (or another copy of that item) back, such as automatically or upon request of the user. If so, at least some users who receive a desired item may eventually be requested or instructed to send that item back to the IT system and/or to the user who provided the item, such as after the customer has finished using the item.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for facilitating transactions between customers of an item transaction system, the method comprising:
registering multiple users as customers of the item transaction system;
for each of at least some of the customers, automatically identifying items for the customer to make available via the item transaction system, wherein the automatic identifying of the items for the customer includes:
retrieving information indicating items previously purchased by the customer from one or more item marketplaces distinct from the item transaction system, and
adding at least some of those indicated items to an available item list for the customer, wherein the available item list of the customer indicates items that are available from the customer to be provided to other customers via transactions with the item transaction system; and
facilitating item transactions involving customers, wherein the facilitating of the item transactions includes:
receiving a request from a customer that is for a first indicated item that is on the available item list of at least one other customer,
providing instructions to one of the at least one other customers whose available item list includes the requested first item, wherein the instructions are to send the requested first item to the customer who made the request;
receiving requests from one or more customers that are each for a second indicated item that is not currently on the available item list of any other of the customers; and
automatically determining to inject additional supply of the second item into the item transaction system based at least in part on demand from customers for the second item exceeding supply of the second item from customers by at least a predetermined threshold, the injecting of the additional supply including acquiring one or more copies of the second item from one or more external sources such that each of at least one of the one or more customers who requested the second item is sent one of the acquired copies of the second item.

2. The method of claim 1 wherein the first and second items are each of one or more specified item types that include at least one of CDs, DVDs, computer software and video games.

3. The method of claim 2 wherein the adding of at least some indicated items previously purchased by a customer to the available item list of the customer includes adding only items that are of at least one of the specified item types.

4. The method of claim 1 wherein the automatic identifying of items for a customer to make available further includes automatically identifying additional items that were previously delivered to the customer after being purchased from the one or more distinct item marketplaces by one or more users distinct from the customer, and automatically adding those identified additional items to an available item list of the customer.

5. The method of claim 4 further comprising automatically identifying items that one of the customers previously designated as being of interest when interacting with the one or more distinct item marketplaces, and automatically adding those identified items to a desired item list of the one customer.

6. The method of claim 1 further comprising automatically adding items to a desired item list of one of the customers that are automatically identified as being recommended for the customer, the desired item list indicating items that the customer desires to obtain via the item transaction system, and wherein at least some of the received requests from customers for items are based on those customers adding those items to desired item lists of the customers.

7. The method of claim 1 wherein the automatic determining to inject the additional supply of the second item into the item transaction system further includes performing an analysis to determine whether expected revenues from future transactions by customers involving the additional supply of the second item are likely to exceed costs of acquiring the additional supply of the second item from the one or more external sources.

8. The method of claim 1 wherein the automatic determining to inject the additional supply of the second item into the item transaction system further includes estimating future demand and future supply for the second item from customers of the item transaction system, and performing an analysis to determine an expected length of time that the future demand from customers for the second item is likely to exceed the future supply of the second item from customers.

9. The method of claim 1 further comprising, for one of the at least some customers, after the adding of the at least some indicated previously purchased items to the available item list of the one customer and before using the available item list of the one customer as part of the facilitating of the item transactions, modifying items on the available item list of the one customer in response to instructions received from the one customer, the modifying including removing at least one of the added indicated previously purchased items from the available item list of the one customer.

10. The method of claim 1 wherein the facilitating of the item transactions further includes, for each first customer who has an indicated item and is instructed to send the indicated item to a second customer who requested the indicated item, performing a first transaction that includes purchasing the indicated item from the first customer and performing a second transaction that includes selling the purchased item to the second customer, the first and second transactions including obtaining one or more units of at least one of a private currency issued by the item transaction system and a governmental-issued monetary currency from at least one of the first and second customers.

11. The method of claim 1 wherein the one or more distinct item marketplaces are operated by a business entity who also operates the item transaction system, and wherein the method further comprises automatically authorizing one or more of the at least some customers to engage in item transactions based at least in part on information about interactions between the one or more customers and the one or more distinct item marketplaces.

12. The method of claim 11 wherein at least one of the one or more distinct item marketplaces is a used item marketplace that sells used items, and wherein the one or more external sources from which the one or more copies of the specified item are acquired are the at least one used item marketplace.

13. A computer-implemented method for facilitating transactions involving users interacting with an item transaction system, the method comprising:
automatically identifying items for one or more users to make available to be provided via an item transaction system, wherein the automatic identifying of the items is performed by one or more configured computing systems and includes, for each of the one or more users:

obtaining information indicating items previously acquired by the user from one or more item marketplaces distinct from the item transaction system, and recommending to the user that at least one of those indicated items be part of one or more available items that the user is willing to provide via the item transaction system;

receiving indications from each of at least some of a plurality of users interacting with the item transaction system of one or more desired items that the user desires to receive via the item transaction system, and receiving indications from each of at least some of the plurality of users of one or more available items that the user is willing to provide via the item transaction system, wherein the at least some users from whom indications are received of the one or more available items include the one or more users for whom items are automatically identified;

for each of at least some of the indicated desired items, matching the desired item to one of the available items indicated by one of the users, and initiating one or more transactions that result in the one available item being obtained from the one user and being provided to the user who indicated the desired item; and automatically determining to add one or more additional items for use by the users interacting with the item transaction system, wherein the automatic determining to add the one or more additional items includes:

determining that demand via the item transaction system for each of one or more items exceeds supply of those items via the item transaction system, the determining being based at least in part on the received indications of desired items and the received indications of available items; and for at least one of the one or more items whose demand exceeds supply via the item transaction system, determining to select the item as one of the additional items to be added based at least in part on assessed information about the item.

14. The method of claim 13 further comprising, for one of the additional items determined to be added, obtaining one or more copies of the one additional item and initiating that each of at least one of the obtained copies be provided to a user who previously indicated a desire to receive the one additional item.

15. The method of claim 14 wherein the copies of the one additional item are obtained via purchase from one or more item marketplaces that are affiliated with an operator of the item transaction system.

16. The method of claim 14 wherein the copies of the one additional item are obtained from one or more of a used item marketplace, a new item marketplace, and an item auction service.

17. The method of claim 14 wherein the obtained copies of the one additional item include multiple copies, and wherein the initiating that each of at least one of the obtained copies be provided to a user who previously indicated a desire to receive the one additional item includes providing the multiple obtained copies to multiple users.

18. The method of claim 14 wherein, for one of the obtained copies of the one additional item, the obtaining of the one copy and initiating that the one copy be provided to a user includes initiating an acquisition of the one copy from an external source that is directed to supply that one copy to the user.

19. The method of claim 14 wherein, for at least one of the obtained copies of the one additional item, the obtaining of the copy includes providing one or more incentives to each of one or more of the users interacting with the item transaction system to make a copy of the one additional item available to be provided via the item transaction system.

20. The method of claim 13 wherein, for each of one or more of the at least one items selected as one of the additional items to be added based at least in part on assessed information about the item, the assessed information includes that the item is a new release that has been publicly available for only a limited time.

21. The method of claim 13 wherein, for each of one or more of the at least one items selected as one of the additional items to be added based at least in part on assessed information about the item, the assessed information includes a determination that adding one or more copies of the item for use by the users interacting with the item transaction system is likely to be profitable to an operator of the item transaction system.

22. The method of claim 13 wherein, for each of one or more of the at least one items selected as one of the additional items to be added based at least in part on assessed information about the item, the assessed information includes a determination that adding one or more copies of the item for use by the users interacting with the item transaction system is likely to produce at least a predetermined amount of goodwill among the users interacting with the item transaction system due to the additional supply of the item.

23. The method of claim 13 wherein, for each of one or more of the at least one items selected as one of the additional items to be added based at least in part on assessed information about the item, the assessed information includes a determination that the demand via the item transaction system for the item exceeds the supply of that item via the item transaction system by at least a predetermined amount.

24. The method of claim 13 wherein, for each of one or more of the at least one items selected as one of the additional items to be added based at least in part on assessed information about the item, the assessed information includes a determination that the demand via the item transaction system for the item exceeds the supply of that item via the item transaction system by at least a predetermined ratio.

25. The method of claim 13 wherein, for each of one or more of the at least one items selected as one of the additional items to be added based at least in part on assessed information about the item, the assessed information includes a determination that the demand via the item transaction system for the item exceeds the supply of that item via the item transaction system by at least a predetermined rate over time.

26. The method of claim 13 wherein, for each of one or more of the at least one items selected as one of the additional items to be added based at least in part on assessed information about the item, the assessed information includes a determination that a period of time longer than a predetermined length of time will occur before the supply of the item via the item transaction system satisfies the demand via the item transaction system for that item.

27. The method of claim 13 wherein the recommending of the at least one indicated items to one of the one or more users includes automatically adding the at least one indicated items to an available item list for the user without prior approval of the user, the available item list of the user being for use in indicating the available items that the user is willing to provide via the item transaction system.

28. The method of claim 13 further comprising, for each of one or more new users desiring to interact with the item transaction system, automatically obtaining information regarding the new user from one or more item marketplaces where the new user has an account, the one or more item marketplaces being distinct from the item transaction system, and using the obtained information to automatically authorize the new user to interact with the item transaction system.

29. The method of claim 13 further comprising obtaining information about one or more items from one or more item marketplaces distinct from the item transaction system, and automatically determining a value of at least one of the items being obtained from one user and provided to another user via the item transaction system based at least in part on the obtained information, the determined value for an item being used for determining an amount to credit an account of a user who provides the item and/or for debiting an account of a user who receives the item.

30. The method of claim 13 further comprising, for each of one or more of the initiations of one or more transactions that result in an available item being obtained from a first user and being provided to a second user, under control of the item transaction system, purchasing the available item from the first user and selling the purchased item to the second user.

31. The method of claim 30 wherein each purchasing of an available item from a first user and selling of the purchased item to a second user includes directing the first user to send the item directly to the second user, such that the item transaction system does not take physical custody of the purchased item.

32. The method of claim 13 further comprising, for each of one or more of the initiations of one or more transactions that result in an available item being obtained from a first user and being provided to a second user, providing the item from the first user to the second user as a rented item such that the first user is entitled to reacquire a copy of the item at a future time.

33. The method of claim 13 further comprising, for each of one or more of the initiations of one or more transactions that result in an available item being obtained from a first user and being provided to a second user, obtaining a monetary transaction fee from at least one of the first and second users, and wherein the method further comprises, for each of at least one of the users interacting with the item transaction system, in response to determining that a number of pre-paid transactions for the user is at a predetermined level, automatically obtaining additional monetary payment from the user to purchase one or more additional pre-paid transactions for use by the user in future item transactions.

34. The method of claim 13 further comprising, for each of one or more of the initiations of one or more transactions that result in an available item being obtained from a first user and being provided to a second user, providing shipping materials to the first user for use in sending the item to the second user.

35. The method of claim 13 further comprising, for each of at least some of the transactions that result in an available item being obtained from a first user and being provided to a second user, tracking the obtaining and/or the providing of the item in order to determine when a predetermined point is reached, and after the predetermined part is determined to be reached, crediting an account of the user who provides the item and/or debiting an account of the user who receives the item.

36. The method of claim 13 wherein at least some of the users who indicate one or more desired items to receive via the item transaction system are also some of the users who indicate one or more available items to provide via the item transaction system.

37. The method of claim 13 wherein the items involved in the transactions via the item transaction system are of one or more specified item types that include at least one of CDs, DVDs, computer software and video games.

38. The method of claim 13 wherein the determining to select one of the items whose demand exceeds supply as one of the additional items to be added is further based at least in part on information specific to one or more users who have indicated demand for the one item, such that one or more copies of the one item that are added are made available to the one or more users.

39. A computer-implemented method for facilitating transactions involving users interacting with an item transaction system, the method comprising:
  automatically identifying items for one or more users to make available to be provided via an item transaction system, wherein the automatic identifying of the items includes, for each of the one or more users,
    obtaining information indicating interactions of the user with one or more item marketplaces distinct from the item transaction system, and
    recommending one or more items to the user for inclusion on a desired item list for the user, the desired item list of the user being for use in indicating the items that the user desires to receive via the item transaction system;
  receiving indications from each of at least some of a plurality of users interacting with the item transaction system of one or more desired items that the user desires to receive via the item transaction system, wherein the at least some users from whom indications are received of the one or more desired items include the one or more users for whom items are automatically identified, and receiving indications from each of at least some of the plurality of users of one or more available items that the user is willing to provide via the item transaction system;
  for each of at least some of the indicated desired items, matching the desired item to one of the available items indicated by one of the users, and initiating one or more transactions that result in the one available item being obtained from the one user and being provided to the user who indicated the desired item; and
  automatically determining to add one or more additional items for use by the users interacting with the item transaction system, wherein the automatic determining to add the one or more additional items is performed by one or more configured computing systems and includes:
    determining that demand via the item transaction system for each of one or more items exceeds supply of those items via the item transaction system, the determining being based at least in part on the received indications of desired items and the received indications of available items; and
    for at least one of the one or more items whose demand exceeds supply via the item transaction system, determining to select the item as one of the additional items to be added based at least in part on assessed information about the item.

40. A non-transitory computer-readable medium whose stored contents configure a computing device to facilitate transactions involving users interacting with an item transaction system, by performing a method comprising:
  automatically identifying items for one or more users to make available to be provided via an item transaction system, wherein the automatic identifying of the items is performed by the configured computing device and includes, for each of the one or more users:
obtaining information indicating items previously acquired by the user from one or more item marketplaces distinct from the item transaction system, and
recommending to the user that at least one of those indicated items be part of one or more available items that the user is willing to provide via the item transaction system;
receiving indications from each of at least some of a plurality of users interacting with the item transaction system of one or more desired items that the user desires to receive via the item transaction system, and receiving indications from each of at least some of the plurality of users of one or more available items that the user is willing to provide via the item transaction system, wherein the at least some users from whom indications are received of the one or more available items include at least one of the one or more users for whom items are automatically identified;
for each of at least some of the indicated desired items, matching the desired item to one of the available items indicated by one of the users, and initiating one or more transactions that result in the one available item being obtained from the one user and being provided to the user who indicated the desired item; and
automatically determining to add one or more additional items for use by the users interacting with the item transaction system, wherein the automatic determining to add the one or more additional items includes:
determining that demand via the item transaction system for each of one or more items exceeds supply of those items via the item transaction system, the determining being based at least in part on the received indications of desired items and the received indications of available items; and
for at least one of the one or more items whose demand exceeds supply via the item transaction system, determining to select the item as one of the additional items to be added based at least in part on assessed information about the item.

41. The non-transitory computer-readable medium of claim 40 wherein the method further comprises, for one of the additional items determined to be added, obtaining one or more copies of the one additional item and initiating that each of at least one of the obtained copies be provided to a user who previously indicated a desire to receive the one additional item.

42. The non-transitory computer-readable medium of claim 40 wherein, for each of one or more of the at least one items selected as one of the additional items to be added based at least in part on assessed information about the item, the assessed information includes one or more of a determination that the demand via the item transaction system for the item exceeds the supply of that item via the item transaction system by at least a predetermined amount and of a determination that a period of time longer than a predetermined length of time will occur before the supply of the item via the item transaction system satisfies the demand via the item transaction system for that item.

43. The non-transitory computer-readable medium of claim 40 wherein the method further comprises, for each of one or more of the initiations of one or more transactions that result in an available item being obtained from a first user and being provided to a second user, under control of the item transaction system, purchasing the available item from the first user, selling the purchased item to the second user, and directing the first user to send the item directly to the second user as part of the purchasing without the item transaction system taking physical custody of the purchased item.

44. The non-transitory computer-readable medium of claim 40 wherein the contents are instructions that when executed program the computing device to perform the method, and wherein the computer-readable medium is a memory of the configured computing device.

45. A computing device configured to facilitate transactions involving users interacting with an item transaction system, comprising:
one or more processors;
a customer registration manager component configured to, when executed by at least one of the one or more processors, automatically identify items for one or more users to make available to be provided via an item transaction system, wherein the automatic identifying of the items includes, for each of the one or more users:
obtaining information indicating items previously acquired by the user from one or more item marketplaces distinct from the item transaction system, and
recommending to the user that at least one of those indicated items be part of one or more available items that the user is willing to provide via the item transaction system;
a transaction manager component configured to, when executed by at least one of the one or more processors:
receive indications from each of at least some of a plurality of users interacting with the item transaction system of one or more desired items that the user desires to receive via the item transaction system, and receive indications from each of at least some of the plurality of users of one or more available items that the user is willing to provide via the item transaction system, wherein the at least some users from whom indications are received of the one or more available items include at least one of the one or more users for whom items are automatically identified; and
for each of at least some of the indicated desired items, match the desired item to one of the available items indicated by one of the users, and initiate one or more transactions that result in the one available item being obtained from the one user and being provided to the user who indicated the desired item; and
an injection manager component configured to, when executed by at least one of the one or more processors, automatically determine to add one or more additional items for use by the users interacting with the item transaction system, wherein the automatic determining to add the one or more additional items includes:
determining that demand via the item transaction system for each of one or more items exceeds supply of those items via the item transaction system, the determining being based at least in part on the received indications of desired items and the received indications of available items; and
for at least one of the one or more items whose demand exceeds supply via the item transaction system, determining to select the item as one of the additional items to be added based at least in part on assessed information about the item.

46. The computing device of claim 45 wherein the injection manager component is further configured to, for one of the additional items determined to be added, obtain one or more copies of the one additional item and initiate that each of at least one of the obtained copies be provided to a user who previously indicated a desire to receive the one additional item.

47. The computing device of claim 45 wherein, for each of one or more of the at least one items selected as one of the additional items to be added based at least in part on assessed information about the item, the assessed information includes one or more of a determination that the demand via the item transaction system for the item exceeds the supply of that item via the item transaction system by at least a predetermined amount and of a determination that a period of time longer than a predetermined length of time will occur before the supply of the item via the item transaction system satisfies the demand via the item transaction system for that item.

48. The computing device of claim 45 wherein the transaction manager component is further configured to, for each of one or more of the initiations of one or more transactions that result in an available item being obtained from a first user and being provided to a second user, under control of the item transaction system, purchase the available item from the first user, sell the purchased item to the second user, and direct the first user to send the item directly to the second user as part of the purchase without the item transaction system taking physical custody of the purchased item.

49. The computing device of claim 45 wherein the customer registration manager component, the transaction manager component, and the injection manager component are each part of the item transaction system, and each includes software instructions for execution by the one or more processors.

50. A non-transitory computer-readable medium whose stored contents configure a computing device to facilitate transactions involving users interacting with an item transaction system, by performing a method comprising:
  automatically identifying items for one or more users to make available to be provided via an item transaction system, wherein the automatic identifying of the items includes, for each of the one or more users:
    obtaining information indicating interactions of the user with one or more item marketplaces distinct from the item transaction system, and
    recommending one or more items to the user for inclusion on a desired item list for the user, the desired item list of the user being for use in indicating the items that the user desires to receive via the item transaction system;
  receiving indications from each of at least some of a plurality of users interacting with the item transaction system of one or more desired items that the user desires to receive via the item transaction system, wherein the at least some users from whom indications are received of the one or more desired items include at least one of the one or more users for whom items are automatically identified, and receiving indications from each of at least some of the plurality of users of one or more available items that the user is willing to provide via the item transaction system;
  for each of at least some of the indicated desired items, matching the desired item to one of the available items indicated by one of the users, and initiating one or more transactions that result in the one available item being obtained from the one user and being provided to the user who indicated the desired item; and
  automatically determining to add one or more additional items for use by the users interacting with the item transaction system, wherein the automatic determining to add the one or more additional items is performed by the configured computing device and includes:
    determining that demand via the item transaction system for each of one or more items exceeds supply of those items via the item transaction system, the determining being based at least in part on the received indications of desired items and the received indications of available items; and
    for at least one of the one or more items whose demand exceeds supply via the item transaction system, determining to select the item as one of the additional items to be added based at least in part on assessed information about the item.

51. The non-transitory computer-readable medium of claim 50 wherein the method further comprises, for one of the additional items determined to be added, obtaining one or more copies of the one additional item and initiating that each of at least one of the obtained copies be provided to a user who previously indicated a desire to receive the one additional item.

52. The non-transitory computer-readable medium of claim 50 wherein, for each of one or more of the at least one items selected as one of the additional items to be added based at least in part on assessed information about the item, the assessed information includes one or more of a determination that the demand via the item transaction system for the item exceeds the supply of that item via the item transaction system by at least a predetermined amount and of a determination that a period of time longer than a predetermined length of time will occur before the supply of the item via the item transaction system satisfies the demand via the item transaction system for that item.

53. The non-transitory computer-readable medium of claim 50 wherein the method further comprises, for each of one or more of the initiations of one or more transactions that result in an available item being obtained from a first user and being provided to a second user, under control of the item transaction system, purchasing the available item from the first user, selling the purchased item to the second user, and directing the first user to send the item directly to the second user as part of the purchasing without the item transaction system taking physical custody of the purchased item.

54. The non-transitory computer-readable medium of claim 50 wherein the contents are instructions that when executed program the computing device to perform the method, and wherein the computer-readable medium is a memory of the configured computing device.

55. A computing device configured to facilitate transactions involving users interacting with an item transaction system, comprising:
  one or more processors;
  a customer registration manager component configured to, when executed by at least one of the one or more processors, automatically identify items for one or more users to make available to be provided via an item transaction system, wherein the automatic identifying of the items includes, for each of the one or more users:
    obtaining information indicating interactions of the user with one or more item marketplaces distinct from the item transaction system, and
    recommending one or more items to the user for inclusion on a desired item list for the user, the desired item list of the user being for use in indicating the items that the user desires to receive via the item transaction system;
  a transaction manager component configured to, when executed by at least one of the one or more processors:

receive indications from each of at least some of a plurality of users interacting with the item transaction system of one or more desired items that the user desires to receive via the item transaction system, wherein the at least some users from whom indications are received of the one or more desired items include at least one of the one or more users for whom items are automatically identified, and receive indications from each of at least some of the plurality of users of one or more available items that the user is willing to provide via the item transaction system; and for each of at least some of the indicated desired items, match the desired item to one of the available items indicated by one of the users, and initiate one or more transactions that result in the one available item being obtained from the one user and being provided to the user who indicated the desired item; and an injection manager component configured to, when executed by at least one of the one or more processors, automatically determine to add one or more additional items for use by the users interacting with the item transaction system, wherein the automatic determining to add the one or more additional items includes:

determining that demand via the item transaction system for each of one or more items exceeds supply of those items via the item transaction system, the determining being based at least in part on the received indications of desired items and the received indications of available items; and for at least one of the one or more items whose demand exceeds supply via the item transaction system, determining to select the item as one of the additional items to be added based at least in part on assessed information about the item.

56. The computing device of claim 55 wherein the injection manager component is further configured to, for one of the additional items determined to be added, obtain one or more copies of the one additional item and initiate that each of at least one of the obtained copies be provided to a user who previously indicated a desire to receive the one additional item.

57. The computing device of claim 55 wherein, for each of one or more of the at least one items selected as one of the additional items to be added based at least in part on assessed information about the item, the assessed information includes one or more of a determination that the demand via the item transaction system for the item exceeds the supply of that item via the item transaction system by at least a predetermined amount and of a determination that a period of time longer than a predetermined length of time will occur before the supply of the item via the item transaction system satisfies the demand via the item transaction system for that item.

58. The computing device of claim 55 wherein the transaction manager component is further configured to, for each of one or more of the initiations of one or more transactions that result in an available item being obtained from a first user and being provided to a second user, under control of the item transaction system, purchase the available item from the first user, sell the purchased item to the second user, and direct the first user to send the item directly to the second user as part of the purchase without the item transaction system taking physical custody of the purchased item.

59. The computing device of claim 55 wherein the customer registration manager component, the transaction manager component, and the injection manager component are each part of the item transaction system and each includes software instructions for execution by the one or more processors.

* * * * *